June 10, 1952     T. HOMMEL     2,600,295
PHOTOENGRAVING EQUIPMENT

Filed Dec. 4, 1948     10 Sheets-Sheet 1

INVENTOR
THEODORE HOMMEL
BY
Alfred W Petchaft
ATTORNEY

INVENTOR
THEODORE HOMMEL
BY
*Alfred W. Petchaft*
ATTORNEY

June 10, 1952     T. HOMMEL     2,600,295
PHOTOENGRAVING EQUIPMENT
Filed Dec. 4, 1948     10 Sheets-Sheet 3
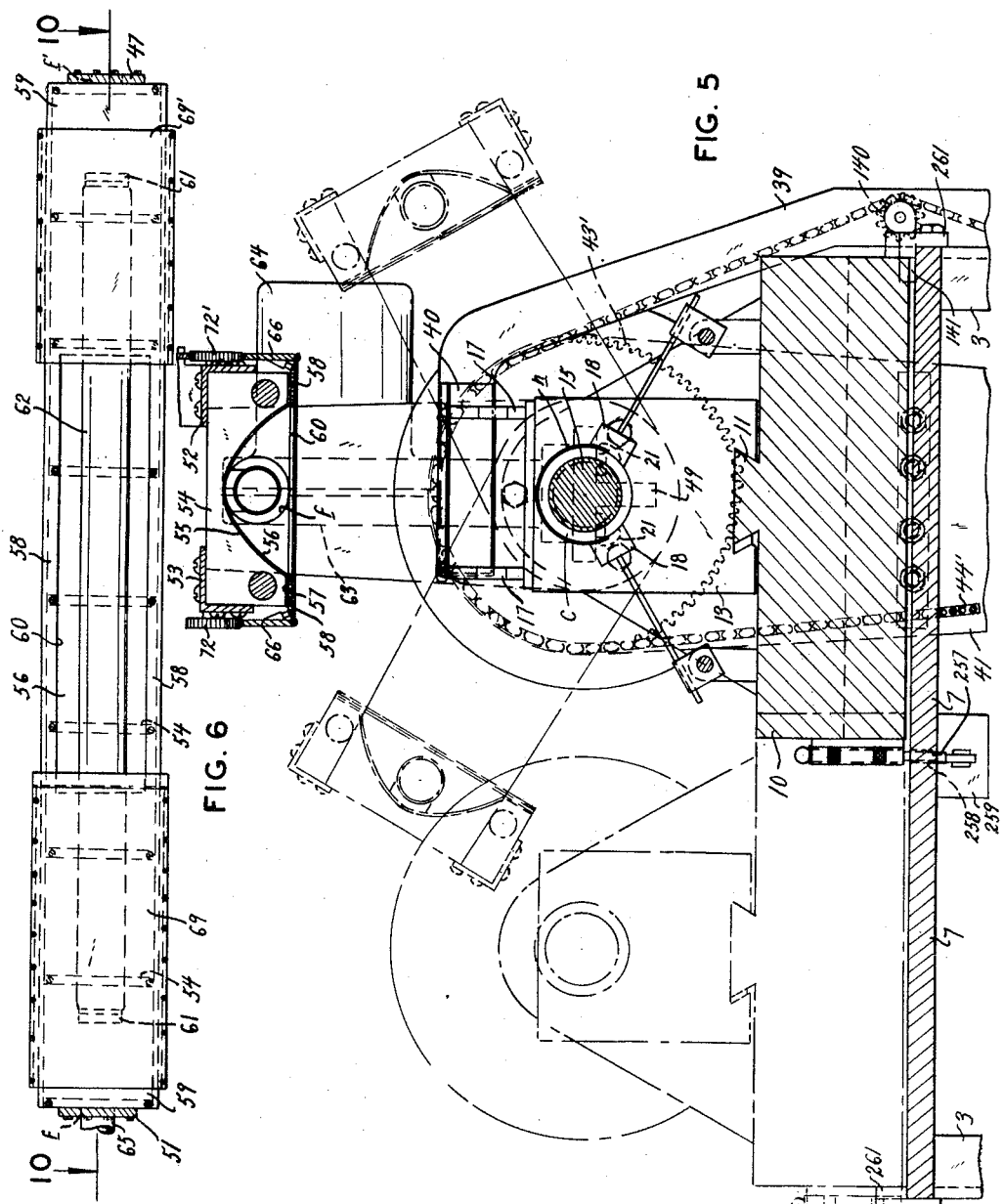
INVENTOR
THEODORE HOMMEL
BY Alfred W Petchaft
ATTORNEY June 10, 1952        T. HOMMEL        2,600,295

PHOTOENGRAVING EQUIPMENT

Filed Dec. 4, 1948        10 Sheets-Sheet 4

INVENTOR
THEODORE HOMMEL
BY
*Alfred W. Petchaft*
ATTORNEY

INVENTOR
THEODORE HOMMEL
BY Alfred W. Petchaft
ATTORNEY

June 10, 1952     T. HOMMEL     2,600,295
PHOTOENGRAVING EQUIPMENT

Filed Dec. 4, 1948     10 Sheets-Sheet 6

INVENTOR
THEODORE HOMMEL
BY
Alfred W. Petchaft
ATTORNEY

June 10, 1952  T. HOMMEL  2,600,295
PHOTOENGRAVING EQUIPMENT
Filed Dec. 4, 1948  10 Sheets-Sheet 7

INVENTOR
THEODORE HOMMEL
BY
Alfred W. Petraeus
ATTORNEY

June 10, 1952  T. HOMMEL  2,600,295
PHOTOENGRAVING EQUIPMENT
Filed Dec. 4, 1948  10 Sheets-Sheet 8

INVENTOR
THEODORE HOMMEL
BY Alfred W. Petcraft
ATTORNEY

June 10, 1952    T. HOMMEL    2,600,295
PHOTOENGRAVING EQUIPMENT
Filed Dec. 4, 1948    10 Sheets-Sheet 10

INVENTOR
THEODORE HOMMEL
BY
Alfred W. Petchaft
ATTORNEY

Patented June 10, 1952

2,600,295

UNITED STATES PATENT OFFICE 2,600,295

PHOTOENGRAVING EQUIPMENT

Theodore Hommel, Webster Groves, Mo., assignor to Universal Match Corporation, St. Louis, Mo., a corporation of Delaware Application December 4, 1948, Serial No. 63,514

16 Claims. (Cl. 95—77.5)

This invention relates in general to certain new and useful improvements in photoengraving equipment and, more particularly, to a type of photo-composing machine which may be referred to as a cylinder step-up machine.

In making photoengraved printing rolls and arcuate plates for use in conjunction with intaglio offset, or letter-press printing presses, it is common practice to sensitize a carefully machined and polished flat or cylindrical surface by applying thereto a suitable light sensitive emulsion or chemical and thereupon exposing the sensitized surface through a suitable negative by conventional photographic technique, so that the design on the negative will be photographically imprinted upon the sensitized surface. Thereafter, the sensitized surface is subjected to a conventional series of chemical processes or developed, as it is commonly called, and, as a result, the design is etched upon the surface of the roller or plate.

In this process, the sensitized roller must be mounted in some suitable form of holding means and the negative secured and snugly placed thereover under dark room conditions, the negative being held in place by some appropriate chemical means. With the negative and holder thus securely held, the exposure is made by turning on a suitable light source for a predetermined period of time. A proper exposure technique requires very precise control of the length of exposure time and the intensity of light brought to bear upon the negative and it is essential that the operator be able to vary or adjust these conditions to meet variations in the density of the negative and other specific requirements of a particular piece of work. Although efforts have been made in the past to control light intensity by various expedients, such as filters, screens, and the employment of groups of light sources which may be used in vary numbers and combinations, these expedients have all proved highly unsatisfactory and it has become common practice to employ a light which is as constant in intensity as may be possible to obtain, relying for variations and control upon exposure time. It is, therefore, essential in any photoengraving apparatus of the type here under discussion to provide means for varying the exposure time over fairly wide limits and yet make provision for accurate control, so that any interval selected will be precisely timed.

In cylinder step-up machines, the sensitized emulsion lies upon the surface of a cylinder and the cylinder and its superposed negative must be held stationary in order to prevent the danger of improper registration between the negative and the sensitized surface during exposure. It is obvious, therefore, that certain portions of the sensitized surface and negative will be relatively close to the light source, whereas other portions will be comparatively remote. Even where an elongated mercury arc tube is used as a light source and is placed in radially spaced parallel relation to the cylindrical surface, that longitudinally extending band of the exposure area which lies directly in radial alignment with the light will receive greatest exposure while the lateral portions of the exposure area will receive appreciably reduced exposure. Some efforts have been made to solve this problem by placing a multiplicity of spaced parallel tubes in an arcuate pattern around the entire exposure area, but such apparatus has been found to be expensive, difficult to use, and, what is most important, unreliable, because it is virtually impossible to match a plurality of light sources, so that each tube or bulb has the same light intensity within close enough limits for accurate photoengraving results.

It is hence the primary object of the present invention to provide a photo-composing machine of the cylinder step-up type which is simple, compact, and economical and is capable of extremely precise construction and operation.

It is a further object of the present invention to provide a machine of the type stated in which all portions of the negative will be subjected to precisely the same degree of light intensity during exposure.

It is an additional object of the present invention to provide a machine of the type stated in which the exposure interval can be varied over a relatively wide range of adjustment and any selected exposure interval will be precisely controlled within extremely close limits.

It is also an object of the present invention to provide a machine of the type stated which is fully automatic and is so constructed that faulty exposures due to mistakes of the operator, malfunctioning of the machine, or other accidental causes are substantially eliminated or prevented.

It is likewise an object of the present invention to provide a fully automatic cylinder step-up machine having a light source which travels in a cylindrical path concentric with the sensitized cylinder at a uniform rate of speed, so that during any selected exposure interval the light will always be positioned at the same distance from every portion of the sensitized surface for exactly the same length of time, producing absolutely uniform exposure throughout the exposed area.

With the above and other objects in view, my invention resides in the novel features of form, construction, arrangement, and combination of parts presently described and pointed out in the claims.

Figures 1, 2, 3:
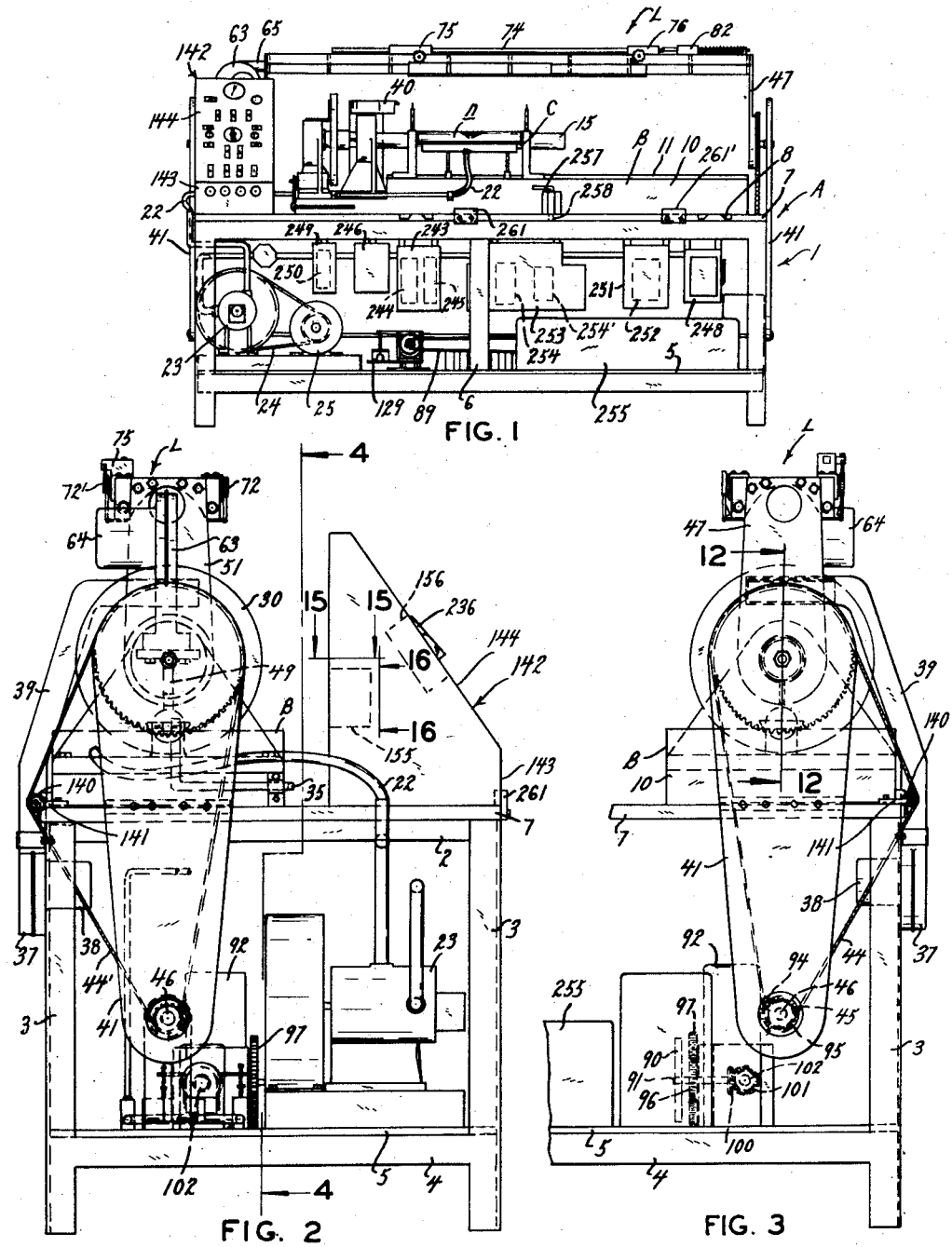
Figure 1 is a front view of a cylinder step-up machine constructed in accordance with and embodying the present invention.
Figure 2 is a side elevational view of the machine taken from the left in Figure 1.
Figure 3 is a fragmentary side elevational view taken from the right in Figure 1.
Figure 4:
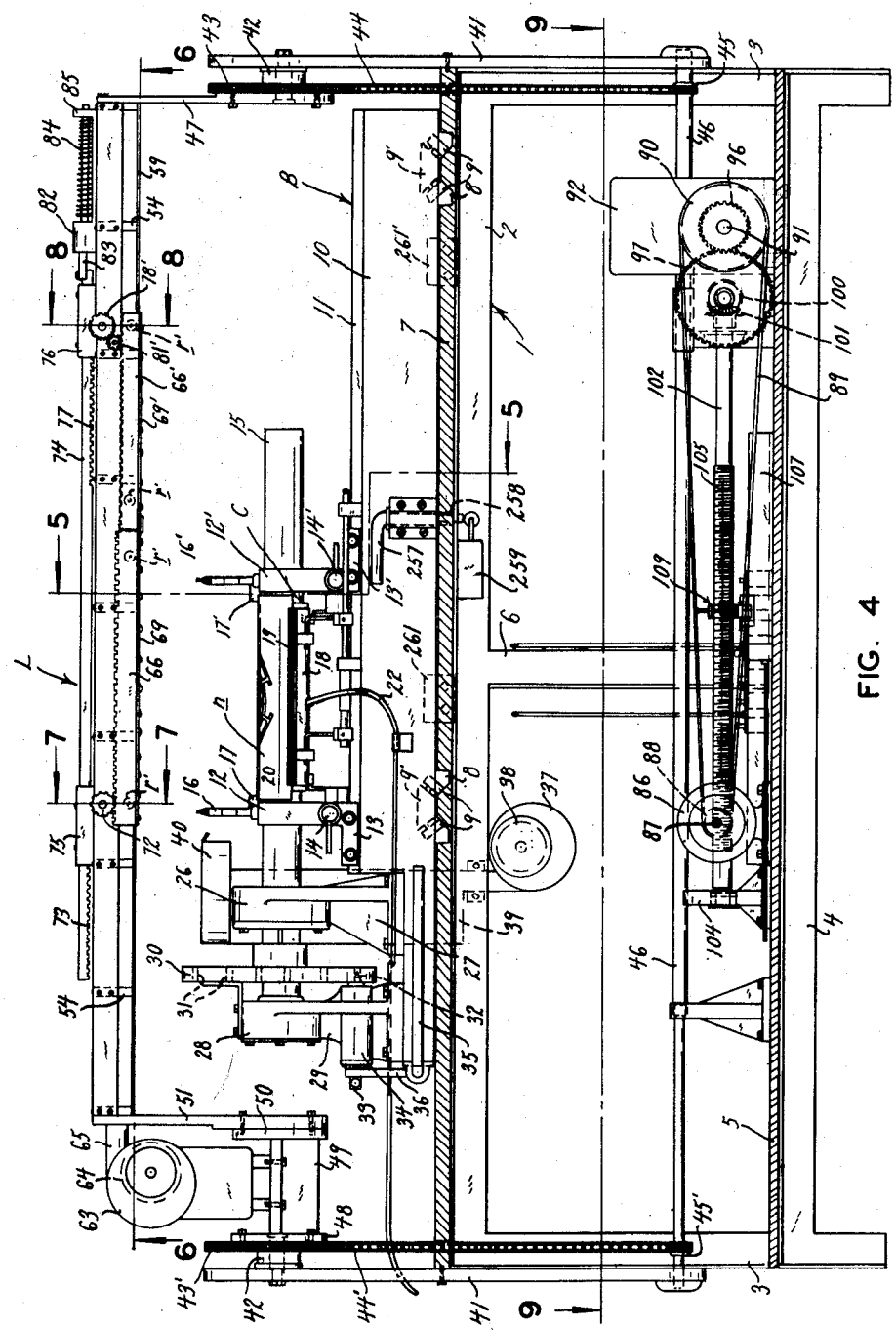
Figure 4 is a transverse sectional view taken along line 4—4 of Figure 2.
Figure 7:
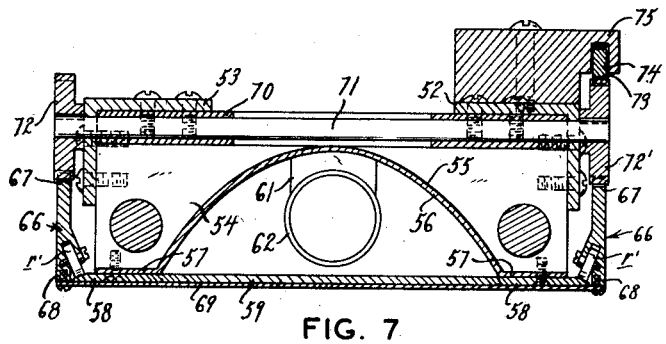
Figure 8:
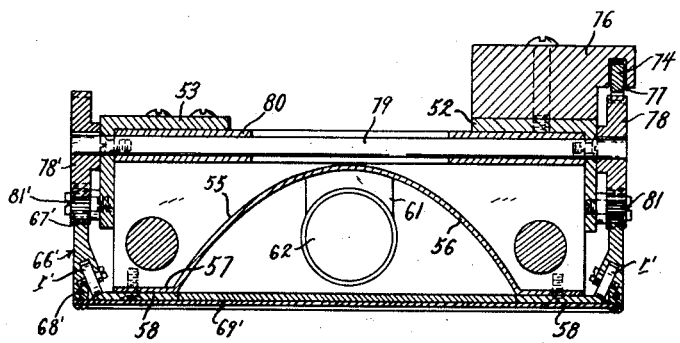
Figure 11:
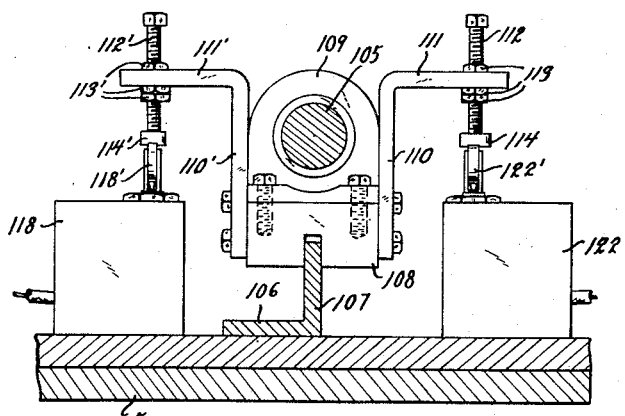
Figure 10:
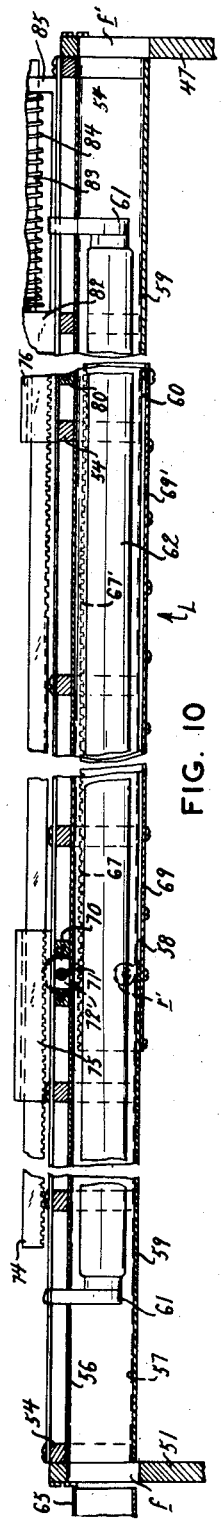
Figure 9:
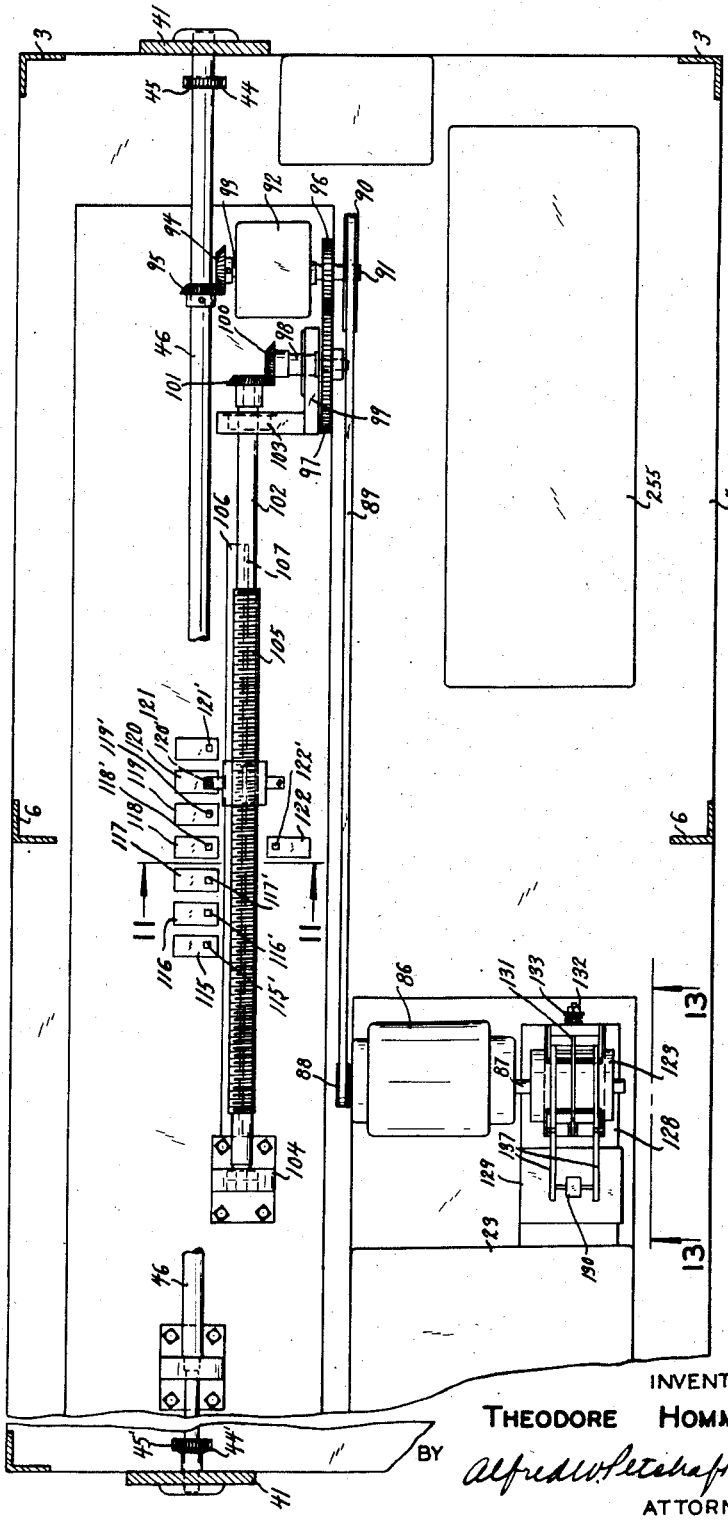
Figure 12:
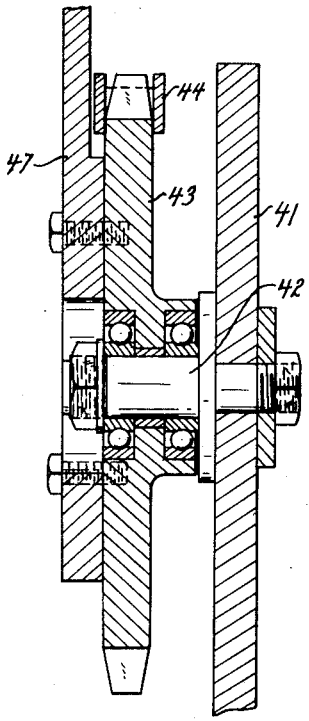
Figure 13:
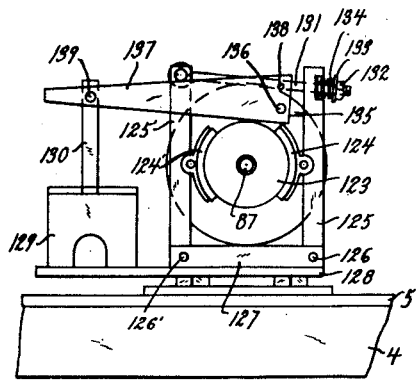
Figure 14:
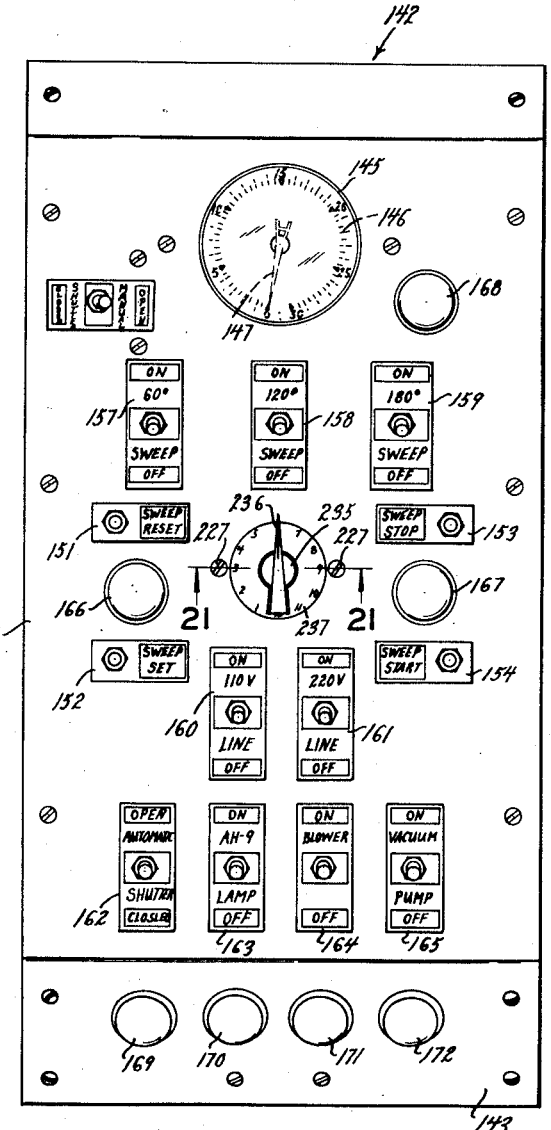
Figure 15:
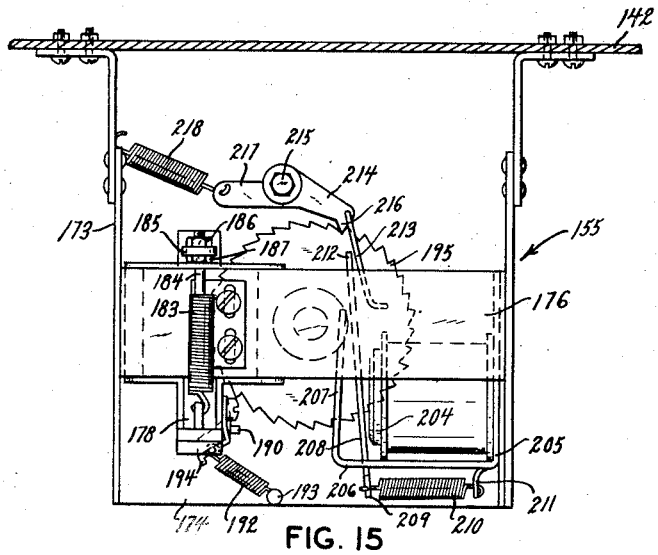
Figure 16:
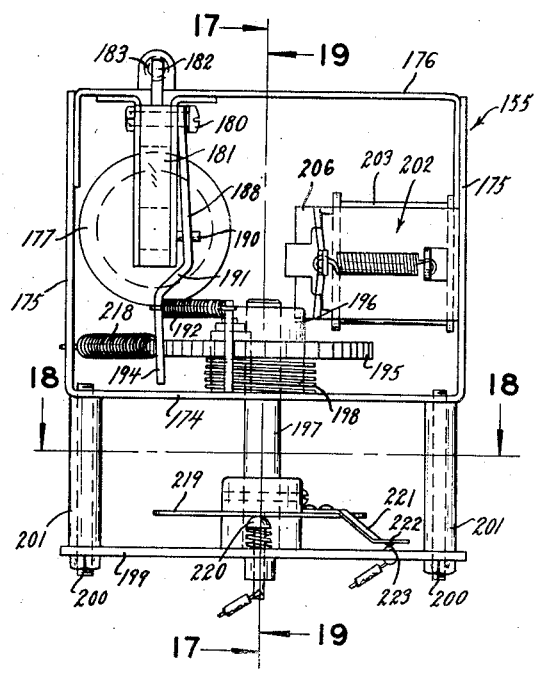
Figure 17:
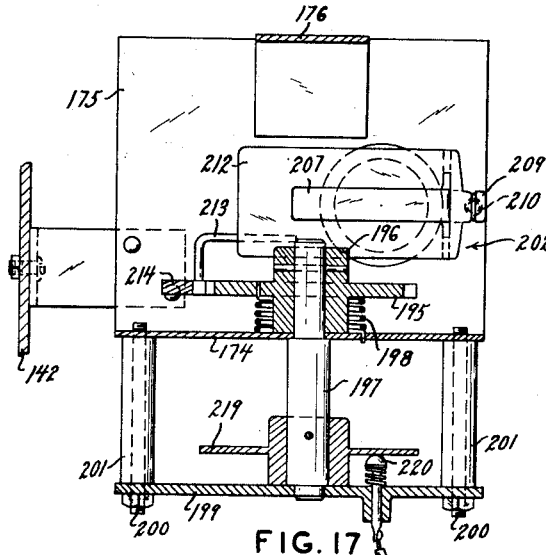
Figure 18:
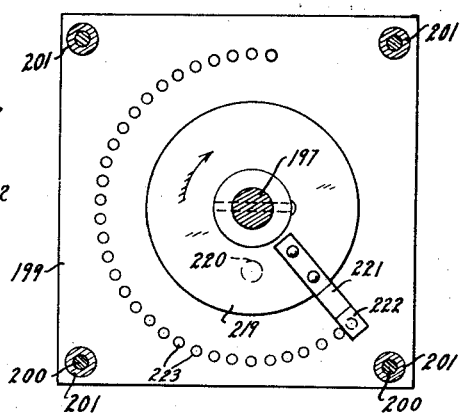
Figure 19:
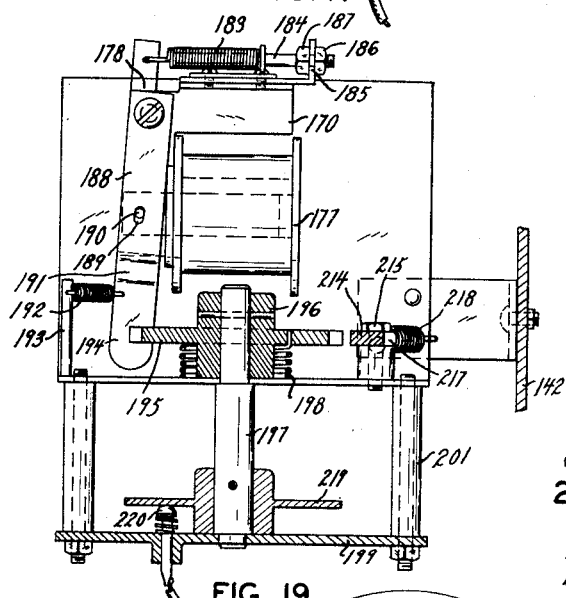
Figure 20:
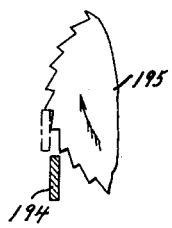
Figure 21:
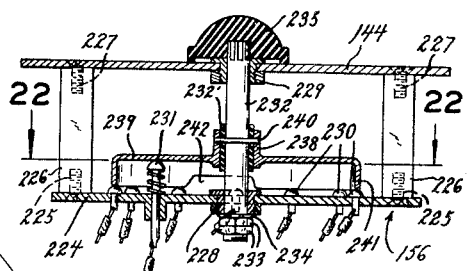
Figure 22:
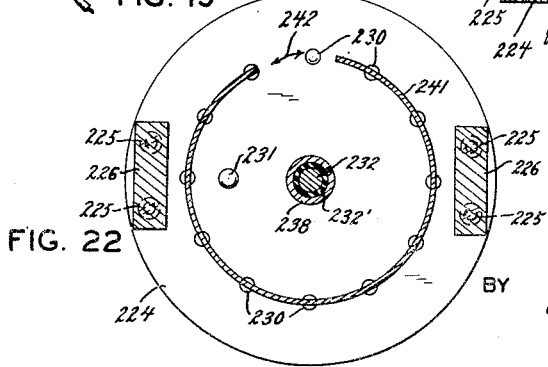
Figure 23:
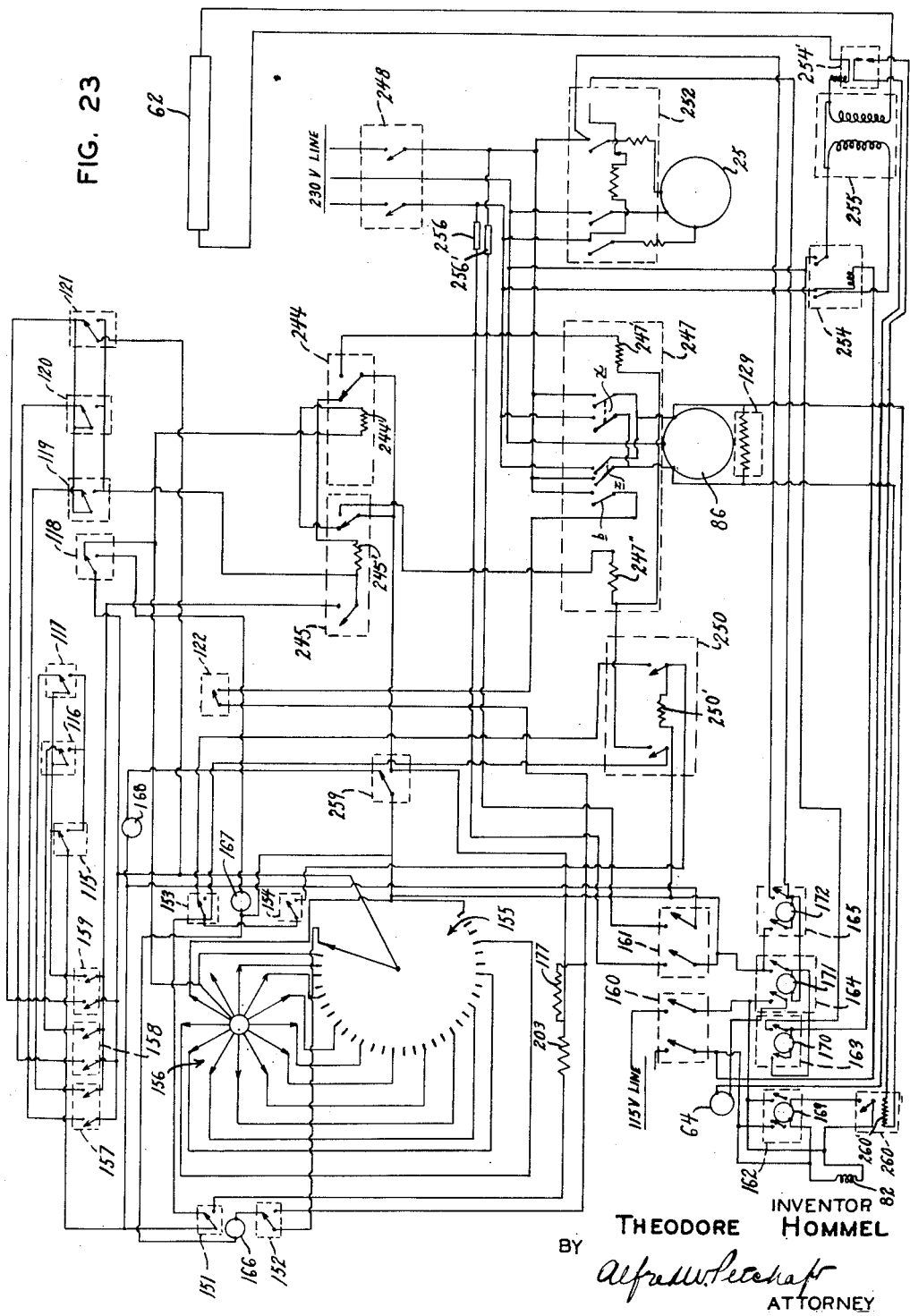
Figure 24:
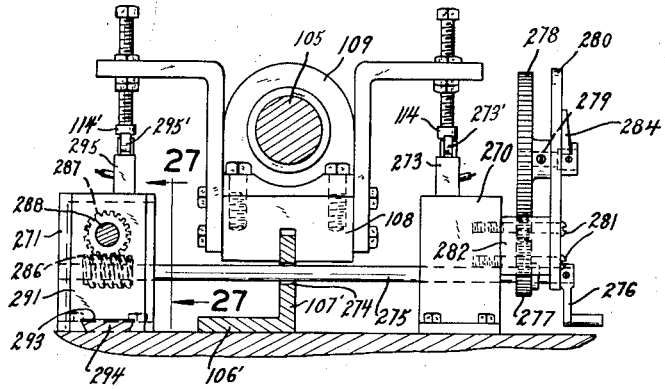
Figure 27:
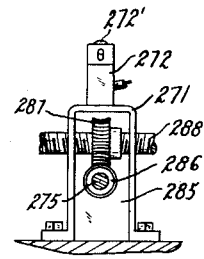
Figure 25:
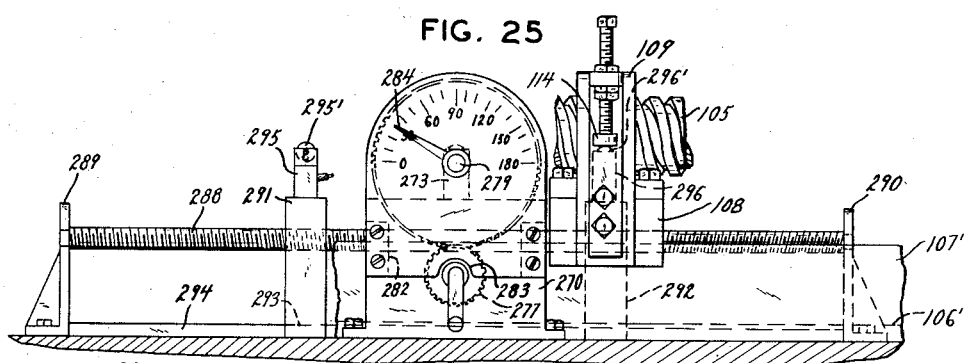
Figure 26:
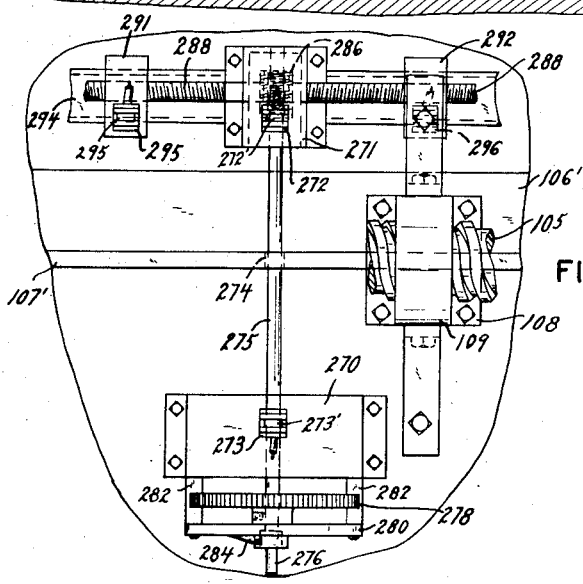

Figures 5, 6, 7, 8, and 9 are transverse sectional views taken along lines 5—5, 6—6, 7—7, 8—8, and 9—9, respectively, of Figure 4;

Figure 10 is a transverse sectional view taken along line 10—10 of Figure 6;

Figure 11 is a transverse sectional view taken along line 11—11 of Figure 9;

Figure 12 is a transverse sectional view taken along line 12—12 of Figure 3;

Figure 13 is a fragmentary sectional view taken along line 13—13 of Figure 9;

Figure 14 is a front view of the control panel;

Figure 15 is a fragmentary sectional view taken along line 15—15 of Figure 2 and showing a detail top plan view of the sweep counter mechanism forming a part of the present invention;

Figure 16 is a fragmentary sectional view taken along line 16—16 of Figure 2 and showing a detail elevational view of the sweep counter mechanism forming a part of the present invention;

Figures 17, 18, and 19 are sectional views taken, respectively, along lines 17—17, 18—18, and 19—19 of Figure 16;

Figure 20 is an enlarged detail view illustrating the operation of the ratchet of the sweep counter mechanism;

Figure 21 is a fragmentary sectional view taken along line 21—21 of Figure 14, showing in sectional detail the cycle selector switch forming a part of the present invention;

Figure 22 is a sectional view taken along line 22—22 of Figure 21;

Figure 23 is a wiring diagram, showing the electrical connections between the various electrical components of the machine;

Figure 24 is an end elevational view of a modified form of positioning mechanism for the sweep control switches;

Figures 25 and 26 are front elevational and top plan views, respectively, of the modified form of positioning mechanism shown in Figure 24; and Figure 27 is a fragmentary sectional view taken along line 27—27 of Figure 24.

Referring now in more detail and by reference characters to the drawings, which illustrate practical embodiments of the present invention, A designates a cylinder step-up machine comprising a support stand 1 having a rectangular horizontal top frame 2 constructed preferably of welded angle iron and provided at its four corners with vertical depending legs 3. Attached to, and extending horizontally between, said legs 3 a short distance upwardly from their lower ends is a rectangular sub-frame 4 also formed of angle iron and supporting a heavy gauge sheet iron shelf 5. For greater rigidity, the sub-frame 4 is tied into the top frame 2 by vertical support rods 6 extending therebetween approximately midway of the ends. Bolted or otherwise rigidly secured upon and extending across the top frame 2 is a bed-plate 7 provided in its upper horizontal face with transversely extending slide grooves 8 for engaging conventional ball-bearing rollers 9 operatively mounted upon the lateral faces of slide blocks 9' supportingly mounted on the under side of a cylinder holding apparatus B preferably of a type more fully disclosed and described in co-pending application for United States Letters Patent, Serial No. 668,178, filed May 8, 1946, now Patent No. 2,547,527, issued April 3, 1951.

For present purposes, it is sufficient to point out that the cylinder holding apparatus B comprises an elongated machine base 10 having longitudinally extending ways 11. Slidably mounted for movement into various relative positions along the base 10 is a pair of mandrel supporting slides 12, 12', provided at their lower extremities with shoe portions 13, 13', having locking means 14, 14', whereby the slides 12, 12', may be locked rigidly in any suitable position along the ways 11.

Precisely journaled in, and extending horizontally through, the upper ends of the slides 12, 12', is a mandrel 15 adapted to support a sensitized cylinder C which is to be photoengraved. Mounted in, and projecting vertically from the upper ends of, the slides 12, 12', are posts 16, 16', for suitably receiving and supporting accurately aligned clamps 17, 17', respectively, designed to hold the negative n. The clamps 17, 17', are so arranged that the negative n can be mounted accurately therein for proper alignment with the cylinder. Swingably mounted upon the base 10 respectively in forwardly and rearwardly spaced parallel relationship to the mandrel 15 are negative holding bars 18 provided upon their exposed faces with cementitiously secured soft rubber contact shoes 19 having an externally presented continuous peripheral lip 20 and an elongated oval or channel-shaped groove 21 communicating through a flexible vacuum line 22 to a vacuum pump 23 mounted upon the sub-frame shelf 5 and drivingly connected by means of a suitable belt 24 to an electric motor 25, all as best seen in Figures 1 and 4.

The mandrel 15 projects outwardly from the slides 12 and extends through a roller bearing 26 mounted upon the upper end of a supporting post 27, which is, in turn, rigidly bolted upon the base 10. Beyond the roller bearing 26, the mandrel 15 is mounted in a second roller bearing 28, which is likewise supported above the base 10 by a head stock 29. Keyed or otherwise rigidly fixed to the portion of the mandrel 15 which extends between the bearings 26, 28, is a disk-like positioning collar 30 having a plurality of equally spaced annularly arranged tapered apertures 31 each adapted to receive the tapered locking tongue 32 formed upon one end of a horizontally shiftable locking rod 33 suitably mounted in, and extending through, a cylindrical enlargement 34 integrally formed in the base of the head stock 29. Swingably mounted upon the lateral end face of the base 10 adjacent the head stock 29 is an operating lever or handle 35 integrally provided on its inner end with an upwardly projecting leg 36 which rockably engages the rod 33, so that, when the handle 35 is swung upwardly toward vertical position, the leg 36 will rock outwardly, withdrawing the rod 33 and the tapered locking tongue 32 from engagement with one of the apertures 31 of the disk 30.

Rigidly mounted upon the rear face of the top frame 3 is a blower 37 conventionally driven by an electric motor 38 and connected at its discharge end by means of a vertical duct 39 to a horizontal air outlet 40 located just above the bearing 26 and in approximate parallelism with the mandrel 15 so as to direct a cooling blast of air horizontally across the upwardly presented face of the negative to prevent overheating thereof during exposure. Rigidly mounted to the opposite transverse end margins of, and extending vertically above and below, the bedplate 7 are trunnion plates 41 provided adjacent their upper ends, and upon their inwardly presented faces, with horizontal trunnions 42, which are precisely aligned axially with each other and the horizontal axis of the mandrel 15 and are adapted for rotatably supporting relatively large sprocket wheels 43, 43', drivingly connected, respectively, by sprocket chains 44, 44', to driving sprockets 45, 45', which are, in turn, pinned upon a horizontal drive shaft 46 journaled at its ends in, and extending horizontally between, the lower portions of the trunnion plates 41 in upwardly spaced parallel relation to the sub-frame shelf 5. Bolted rigidly upon and offset from the inner face of the sprocket wheel 43 is a radially projecting arm 47, and similarly bolted to the inner face of the sprocket wheel 43' is a bracket plate 48 integrally provided with a horizontally inwardly extending bracket arm 49 terminating at its inner end in an integral vertically extending end plate 50, to which is bolted a radially extending arm 51 of substantially the same size and shape as the arm 47 and disposed parallel thereto and in marginal registration therewith.

Securely bolted at their opposite ends to, and extending horizontally between the upper ends of, the arms 47, 51, are relatively heavy angle sections 52, 53, transversely connected at uniformly spaced intervals along their length by relatively thick vertical truss plates 54 which project at their lower margins substantially below the lower margins of the angle sections 52, 53, and have an upwardly curved bottom margin 55 of substantially parabolic contour for supporting an inverted light trough 56 extending longitudinally between, and abutting at its ends against, the inner faces of the arms 47, 51. Along its longitudinal margins, the light trough 56 is provided with outwardly projecting flat flanges 57 for securement to the outer portions of the under faces of the truss plates 54 and are held down by relatively heavy flat runner bars 58 which are transversely connected at their outer ends by shield plates 59 which extend inwardly over the downwardly opening face of the light trough 56 for a substantial distance inwardly from the arms 47, 51, leaving a centrally located rectangular light opening or aperature 60. Operatively mounted, so as to lie symmetrically within the light trough 56, are electrical socket elements 61 for receiving the ends of a tubular light source 62, such as a mercury vapor discharge lamp or high wattage fluorescent tube, for example. The arms 47, 51, are also provided with apertures $f$, $f'$, located in alignment with the axis of the tubular light source 62, as best seen in Figure 10 and for purposes presently more fully appearing.

When the light source 62 is energized or lit, it will generate a very intense amount of light and at the same time will reach a very high temperature. For this reason, the downwardly presented face of the light trough 56, which is parabolic in cross sectional shape, is preferably polished or otherwise treated to become light reflective; whereas, the opposite surface is left dull in order to radiate and thus dissipate as much heat as posible. It will also be noted in this connection that the supporting structure for the light trough is relatively open so as to provide for maximum ventilation. Finally, a conventional blower 63 is bolted or otherwise suitably mounted upon the bracket arm 49 and is conventionally driven by an electric motor 64. The blower 63 is connected at its discharge end to an outlet duct 65 which extends through the aperture $f$ in the arm 51 and discharges a strong high velocity draft of air from the blower 63 along the light source 62 and out through the aperture $f'$ in the arm 47.

The runner bars 58 project marginally outwardly beyond the longitudinal edges of the light trough 56 to provide track-ways for ball bearing rollers $r'$ operatively mounted at spaced intervals in shutter slides 66 which are integrally provided on their upper faces with racks 67 and upon their lower faces with downwardly projecting ribs 68. Marginally bolted to the ribs 68 and extending transversely across the light trough 56 is a shutter plate 69 disposed for snugfitting sliding abutment against the under face of the runner bars 58. It should be noted in this connection that this abutment must be sufficiently tight to prevent light leaks, but, at the same time, should permit relatively free sliding movement of the shutter plate to and fro over the left hand half of the aperture 60.

Similarly mounted along the right hand end of the runner bars 58 are shutter slides 66' substantially identical with the previously described shutter slides 66 and likewise being integrally provided upon their upper faces with racks 67' and upon their upper faces with racks 67' and upon their under faces with depending ribs 68' for receiving a shutter plate 69' which extends transversely across the light trough 56 and is adapted for slidable movement to and fro across the right hand half of the aperture 60. Rigidly mounted upon and extending transversely between the angle sections 52, a short distance inwardly from the arm 51, is an inverted U-shaped journal bracket 70 for rotatably supporting a shaft 71 which projects transversely therethrough and is provided at its outwardly proecting ends with pinions 72, 72', for meshing engagement, respectively, with the front and rear racks 67, so that when the shaft 71 is rotated in a counter-clockwise direction (reference being made to Figure 4) the shutter slides 66 and the shutter plates 69 carried thereby will be shifted longitudinally to the right to cover the left hand side of the aperture 60 and, contrariwise, when the shaft 71 is rotated in the opposite or clockwise direction the shutter plates 69 will be shifted to the left uncovering the left hand side of the aperture 60.

The rearward pinion 72' is also in meshing engagement on its upper side with a downwardly presented rack bar 73 which is securely bolted to a long slide bar 74 which, at its left hand end, extends through and is shiftably mounted in a slide block 75 which is, in turn, rigidly bolted to the rear angle section 52. At its right hand end the slide bar 74 extends through, and is slidably mounted in, a second slide block 76 and is similarly provided upon its under face with a depending rack bar 77 which meshes with a pinion 78 pinned upon one extending end of a shaft 79 journaled in and projecting transversely through a second inverted U-shaped journal bracket 80 and is rigidly provided at its forwardly projecting end with a companion pinion 78'. On their under sides, the pinions 78, 78', mesh with operatively mounted idler gears 81, 81', which in turn are in meshing engagement upon their under sides with the racks 67' of the right hand shutter slides 66'. When shaft 79 and the pinions 78, 78', are rotated in a counter-clockwise direction (reference being again had to Figure 4), the idler gears 81, 81', will rotate in a clockwise direction causing the racks 67' and the shutter slides 66', together with the shutter plates 69' carried thereby, to shift to the left, covering the right-hand half of the aperture 60, and, contrariwise, when the shaft 79 is rotated in a clockwise direction, the shutter plates 69' will be correspondingly shifted to the right to uncover the right-hand half of the aperture 60. It should be noted in this connection that, as the pinion 78 rotates in a counter-clockwise direction, the slide bar 74 and its associated rack members 73, 77, will be shifted to the left, transmitting counter-clockwise movement to the pinion 72' and its associated shaft 71. Thus, it is to be seen that the shutter plates 69' will move toward and away from each other simultaneously to open and close the light aperture 60. It should furthermore be noted in this connection that the various tooth-ratios of the racks 67, 67', 73, 77, and the pinions 72, 72', 78, 78', and the idler gears 81, 81' are such that the shutter plates 69, 69', will be brought into light-proof endwise abutment approximately at the center line of the light aperture 60 when they are shifted into closed position, and the shutter plate 69 is finally provided around its abutting margins with a laterally projecting lip which overlaps the abutting margin of the shutter plates 69' when the shutter plates 69, 69', are in closed position so as to insure against light leakage. Mounted upon and extending between the angle sections 52 to the right of the shaft 79 is a shutter operating solenoid 82 having a plunger rod 83 connected at one end to the slide bar 74 and biased to the left by a strong compression spring 84 which abuts against a bracket arm 85 forming part of the solenoid frame, all as best seen in Figure 4. The arms 47, 51, and associated structure, including the lamp 62 and shutter plates 69, 69', may, for convenience, be referred to as the "lamp assembly" L.

Bolted or otherwise securely mounted upon the sub-frame shelf 5, adjacent the forward edge thereof, is a main-drive electric motor 86 having a rearwardly extending drive shaft 87 provided with a drive pulley 88, which is, in turn, connected by a flexible belt 89 to a driven pulley 90 keyed upon the forward end of a shaft 91 forming part of a conventional gear reduction transmission or drive assembly 92 having a rearwardly projecting transmission shaft 93, which is, in turn, provided with a bevel gear 94 for meshing engagement with a companion bevel gear 95 pinned to the shaft 46.

Pinned to the shaft 91 inwardly of the driven pulley 90 is a spur gear 96 in meshing engagement with a second spur gear 97, which is, in turn, pinned upon a horizontal jack shaft 98 journaled in a bearing post 99 and provided on its rearwardly projecting end with a bevel gear 100 for meshing engagement with a companion bevel gear 101 pinned upon the projecting end of a control shaft 102 journaled in and extending between bearings 103, 104. For a relatively extensive portion of its length intermediate the bearings 103, 104, the control shaft 102 is provided with a diametrically enlarged externally threaded portion forming a lead screw 105. Welded upon the upper face of the sub-frame shelf 5 is an L-shaped member 106 having a vertically upwardly projecting rail 107 disposed in downwardly spaced parallel alignment with the axis of the control shaft 102. Slidably mounted upon the rail 107 for to-and-fro movement lengthwise therealong in a slide block 108 which is bolted along its upper face to a nut member 109 threadedly mounted on the lead screw 105. Also bolted upon the lateral faces of the guide block 108 are two upwardly extending L-shaped brackets 110, 110', respectively having forwardly and rearwardly extending horizontal arms 111, 111', for carrying vertically adjustable threaded posts 112, 112', held in place by conventional lock nuts 113, 113', and being provided on their lower ends with contact shoes 114, 114', all as best seen in Figure 11 and for purposes presently more fully appearing.

Securely mounted upon the upper face of the sub-frame shelf 5 in uniformly spaced longitudinal alignment along the path of movement of the contact shoe 114' are seven identical micro-switches 115, 116, 117, 118, 119, 120, and 121, and similarly mounted in forward alignment with the middle micro-switch 118 is a micro-switch 122 disposed in the path of movement of the contact shoe 114.

When the main drive motor 86 is energized, the shafts 91, 93, will be turned and the shafts 46 and 102 will be correspondingly rotated. The rotation of the shaft 46 will, in turn, be transmitted through the sprocket chains 44 to the sprockets 43 and the arms 47, 51, will accordingly be rocked forwardly or rearwardly as the case may be. At the same time, the nut 109 and the slide block 108 carried thereby will traverse along the lead screw 105 and the contact shoes 114, 114', will ride over the rollers 115', 116', 117', 118', 119', 120', 121', and 122'. The micro-switches 115, 116, 117, 118, 119, 120, 121, and 122 are normally in the position shown in the wiring diagram, Figures 23, which, for convenience, may be referred to as the "closed" position. Actually, the machine A is so set up that when the lamp assembly L is in vertical position, as shown in full lines in Figure 4, the contact shoes 114, 114', will lie astride the middle micro-switches 118 and 122. For convenience, this position may be referred to as the "zero" position and one complete cycle of movement of the lamp assembly L forwardly to the limit of forward travel, backwardly through "zero" position to the limit of backward travel, and thence forwardly again to "zero" position may be referred to as one "sweep." Furthermore, the gear reduction drive assembly 92 is preferably so constructed that when the main drive motor 86 rotates the pulley 90 in a counterclockwise direction (reference being made to Figure 4), the shaft 46 will be rotated in such direction that the lamp assembly L will swing arcuately forwardly. Simultaneously, the nut 109 and the slide block 108, together with associated structure, will shift to the right, and, contrariwise, as the motor 86 reverses its direction, the lamp assembly L will swing rearwardly and the slide block 108 will correspondingly move to the left.

Inasmuch as the lamp assembly L always swings at a uniform speed along the periphery of its arc of travel, the area of exposure can be controlled by the length of arc selected for the sweep and the length of exposure can be controlled by the number of sweeps made during a single exposure. Hence, the machine A is provided with controls, presently to be more fully described, whereby any selected number of sweeps can be automatically made and the arc of movement during each sweep can be limited to either 60°, 120°, or 180°, that is to say, the total arc traversed by the arms 47, 51, between the forward and rearward limits of travel will be either 60°, 120°, or 180°, as the case may be. The limit-control of this arc of movement is a function of the micro-switches 115 to 121, inclusive. If the 60° sweep is selected, by means and in a manner presently to be more fully described, the shoe 114' will contact the roller 119' of the micro-switch 119, which will, in turn, initiate a series of circuit rearrangements, also more fully discussed hereinafter, to the end that the direction of rotation of the motor 86 will be reversed and the slide block 108 will be traversed to the left past the "zero" position until the shoe 114' contacts the roller 117' of the micro-switch 117, which will, in turn, initiate a series of circuit rearrangements, again reversing the motor 86. Thus, the slide block 108 and the shoes 114, 114', carried thereby will shuttle back and forth between the switches 117, 119, and gearing and various tooth-ratios in the machine A are such that the lamp assembly L will, under such circumstances, travel through an arc of 60°, i. e., 30° on each side of "zero" position. If either a 120° and 180° sweep is desired, manually operable control switches, presently to be described, may be optionally actuated to render the switches 117, 119, inoperative as limit switches and cause the switches 116, 120, or 115, 121, as the case may be, to assume the sweep limit-control function.

The motor shaft 87 also projects forwardly from the main drive motor 86 and is provided with a brake drum 123 which runs between two diametrally opposed arcuate brake shoes 124, 124', respectively carried by brake arms 125, 125', rockably mounted, as at 126, 126', upon and extending vertically upwardly from a pivot block 127, which is, in turn, mounted on a base plate 128 which projects laterally therefrom and on its projecting end is provided with a solenoid 129 having an upwardly extending plunger rod 130. Rockably pinned to the upper end of the brake arm 125' is a link rod 131 extending over the brake drum 123 and projecting loosely through the upper end of the other brake arm 125. On such projecting end, the link rod 131 is threaded to receive a nut 132 and washer 133 which abuts endwise against a relatively strong compression spring 134, which, in turn, abuts at its other end against the brake arm 125, so that the brake arms 125, 125', are normally biased toward each other and the brake shoes 124, 124', tightly grip the brake drum 123. Welded or otherwise rigidly mounted on the brake arm 125 below the link rod 131 is an inwardly extending block 135 provided with a short pivot stud 136 for pivotally supporting a rocker arm 137, which is also rockably connected to the link rod 131 by a pin 138, which is spaced upwardly a substantial distance from the pivot stud 136. At its free end, the rocker arm 137 is rockably connected by means of a pin 139 to the upper end of the solenoid plunger rod 130, all as best seen in Figure 13.

The solenoid 129 is connected in parallel with the electrical leads to the main drive motor 86, so that, as the motor 86 is energized, the solenoid 129 will likewise be energized, drawing the plunger rod 130 downwardly. The rocker arm 137 will also be swung downwardly by the pivot stud 136. This rocking movement of the rocker arm 137 will cause the pivot stud 136 and the pin 138 to move in opposite directions relative to each other and, in effect, shift the link rod 131 to the left against the bias of the compression spring 134. This action will swing the upper ends of the brake arms 125, 125', away from each other and accordingly shift the brake shoes 124, 124', out of gripping engagement with the brake drum 123, thereby releasing the motor shaft 87 and permitting it to commence rotation. As soon as the circuit to the motor 86 is broken and the motor is de-energized, the solenoid will instantaneously release the plunger rod 130, so that the compression spring 134 will instantly shift the brake arms 125, 125', toward each other again and the brake shoes 124, 124', will again grip the brake drum 123, bringing the motor shaft 87 to an instantaneous stop without permitting any over travel. It should be noted in this connection that the compression spring 134, the brake shoes 124, 124', and intermediate associated parts must be very sturdily constructed because the motor shaft 87 and all of the components driven thereby, including the lamp assembly L, will possess a substantial amount of inertia, requiring a fairly heavy and positive braking action in order to bring the mechanism to an instantaneous stop when the motor is de-energized.

Inasmuch as it is desirable to bring the entire mechanism to a precise and immediate stop whenever the motor 86 is de-energized, it is essential to prevent backlash in the sprocket chains 44. Therefore, the sprocket chains are trained over small idler sprockets 140 which are rotatably carried by small brackets 141, which are, in turn, mounted for shifting adjustment upon the bed plate 7 and project rearwardly beyond the rear edge thereof. By a slight amount of forward or rearward adjustment of the brackets 141, from time to time, any backlash or looseness in the sprocket chains 44 may be eliminated.

Suitably mounted upon the bed plate 7, at the forward left-hand corner thereof, is a control box 142 having a forwardly presented vertical panel 143 and a rearwardly inclined main panel 144. Set into the panel 144 is a vacuum gauge 145 operatively connected to the vacuum pump and having a visible dial 146 and an indicating needle 147, so that the operator may at all times control and adjust the amount of vacuum in the vacuum lines 22. Also mounted in the panel 144 are four two-point single-blade toggle switches 151, 152, 153, 154, which are respectively labeled "sweep reset," "sweep set," "sweep stop," "sweep start." Operably mounted within this control box 142 is a so-called sweep counter mechanism 155 and mounted upon the panel 144 is a cycle selector switch 156, both presently to be more fully described. Also set into the panel 144 are three single-pole double-throw toggle switches 157, 158, 159, respectively labeled "60° sweep," "120° sweep," "180° sweep," and two double-pole single-throw toggle switches 160, 161, respectively labeled "110 v. line," "220 v. line." Similarly set into and carried by the panel 144 and adjacent the lower margins thereof are four double-pole single-throw toggle switches 162, 163, 164, 165, respectively labeled "shutter," "lamp," "blower," and "vacuum pump."

Set into and carried by the panel 144 are three bull's-eye type signal lights 166, 167, 168. Similarly set into and carried by the panel 143 are four equally spaced horizontally aligned bull's-eye type signal lights 169, 170, 171, 172.

The sweep counter mechanism 155 comprises a skeleton frame 173 having a horizontal base plate 174 and upwardly extending side plates 175. Flanged over at its opposite ends, and secured to the upper ends of the side plates 175, is a cross-plate 176 for supporting, upon its under face, an electromagnet 177 having an enclosing frame 178 and a pole piece 179 projecting outwardly from an end thereof. Swingably mounted upon the frame 178 by means of a pivot stud 180 is a leaf type armature 181 provided at its upper end with an extension arm 182 for engagement in one end of a tension spring 183 secured at its other end upon a tension adjusting stud 184 which projects through an upstanding eye 185 formed upon the upper face of the cross-plate 176. Threaded upon the projecting end of the stud 184 for adjustably shifting it lengthwise with respect to the eye 185 is an adjustment nut 186 and lock nut 187. Rockably and swingably mounted upon the pivot stud 180 is an actuating arm 188 provided intermediate its ends with an elongated aperture 189 for loose fitting engagement with a pin 190 fixed in and projecting outwardly from the armature 181. Below the aperture 189, the actuating arm 188 is provided with an offset bend 191 and, below the latter, is apertured for engagement with one hooked end of a tension spring 192, which is, in turn, hooked at its other end around an upstanding post 193 mounted in the base plate 174 upwardly from, and to one side of, the armature 181, so that its axis will extend at a substantial angle to the path of movement of the armature 181 and thereby urge the actuating arm 188 laterally outwardly from the side face of the armature 181. Below the offset bend 191, the actuating arm is provided with a downward extension 194 terminating just above the frame plate 174 and adapted, upon forward movement of the armature 181, for edgewise engagement with one of the teeth of a ratchet wheel 195 formed with an integral hub portion 196 bearing upon its downwardly presented end face against the upper face of the frame plate 174 and being pinned to the upper end of a vertical shaft 197 journaled in and extending downwardly through the frame plate 174, and disposed encirclingly around the lower portion of the hub 196 is a spiral spring 198 secured at its lower end to the frame plate 174 and at its upper end to the ratchet wheel 195. At its lower end, the shaft 197 is, in turn, also journaled in a dielectric terminal plate 199, which is secured in downwardly spaced relationship beneath the frame plate 174 by means of a plurality of threaded studs 200 and spacer sleeves 201.

Mounted upon one of the side plates 175, and projecting inwardly over the ratchet wheel 195, is a resetting mechanism 202 comprising a magnetic coil 203 and a stationary pole piece 204 secured within a frame 205, which is, in turn, provided with an outwardly projecting, preferably integral, tongue portion 206 having an integral stop arm 207 bent over approximately at right angles to the tongue portion 206 and extending across, and in outwardly spaced relationship to, the pole piece 204. Swingably mounted upon the tongue 206, and extending between the pole piece 204 and the stop arm 207, is an armature plate 208 projecting at one end, as at 209, beyond the tongue 206 for engagement with one end of a tension spring 210, which is, in turn, at its other end, connected to an ear 211 struck up from the magnet-frame 205 for normally urging the armature 208 outwardly away from the pole piece 204 and against the stop arm 207. At its other end, as at 212, the armature bears against an actuating bar 213 mounted rigidly in and extending from a pawl 214 pivoted at its mid-portion upon an upstanding stud 215 mounted in the frame plate 174. The pawl 214 is provided at one end with a tongue 216 suitably shaped for engagement in the interdental spaces of the ratchet wheel 195 and at its other end is provided with an outwardly extending arm 217 apertured for receiving one hooked end of a tension spring 218, which is, in turn, at its other end, suitably fastened to the side plate 175 for normally urging the pawl 214 into retentive engagement with one of the teeth of the ratchet wheel 195.

It will be apparent that, as the actuating electromagnet 177 is energized, the armature 181 and its associated actuating arm 188 will be swung inwardly toward the pole piece 179 from the position shown in full lines to the position shown in dotted lines in Figure 16, advancing the ratchet wheel by a distance of one tooth, so to speak. Because the actuating arm 188 is more or less loosely mounted upon the stud 180 and is free to rock laterally, it will swing slightly toward the armature 181 along the pin 190 during this advancing movement so as not to bind the tooth of the ratchet wheel 195. When the current energizing the electromagnet 177 is interrupted, the armature 181 will be released and the actuating arm 188 will be pulled backwardly into original position for engagement with the next successive tooth of the ratchet wheel 195. It will thus be evident that each time the electromagnet 177 is energized, the ratchet wheel 195 will be advanced a single tooth or step. Furthermore, it will be evident that, as the ratchet wheel 195 is advanced, the spring 198 will be placed under increasing tension and will return the ratchet wheel 195 to its original position upon release or disengagement from the pawl 214.

When the coil 203 is energized, the armature plate 208 will be swung inwardly against the pole piece 204 and the extended end 212 of the arm 208 will bear against and swing the actuating bar 213 of the pawl 214 outwardly, disengaging the pawl 214 from, and thereby releasing, the ratchet 195, which will thereupon be returned to initial position under influence of the spring 198.

Pinned to the lower end of the shaft 197 is a conductive disc 219 bearing upon its under face against a spring-pressed conductor button 220, which is mounted in the dielectric terminal plate 199. Secured to, and extending outwardly from, the conductive disc 219 is a conductor arm 221, which is bent downwardly and terminates in a contactor shoe 222 which sweeps over a series of thirty-three contact buttons 223 mounted in a uniformly spaced circular series upon the upper face of the dielectric terminate plate 199 along an arc concentric with the shaft 197. It should be noted in this connection that the several buttons 223 are so spaced from each other that the contactor shoe 222 will move successively from one such button 223 to the next adjacent button 223 as the ratchet wheel 195 progresses step by step.

The cycle selector switch 156 comprises a circular dielectric base plate 224 rigidly bolted by means of pairs of screws 225 to the rearwardly presented ends of oblong-rectangular mounting posts 226, which are, in turn, rigidly secured by means of mounting screws 227 to the inner face of the panel 144, so that the base plate 224 is held in rearwardly spaced parallel relation thereto. Mounted concentrically in, and extending through, the base plate 224 is a bearing sleeve 228, and similarly mounted in the panel 144 in axial alignment with the bearing sleeve 228 is a second identical bearing sleeve 229. Also mounted in the dielectric base plate 224, in a uniformly spaced circular series concentrically around the sleeve 228, are twelve contact buttons 230, and shiftably mounted in, and extending through, the dielectric base plate 224 is a spring-pressed conductor button 231. Rotatably mounted in, and extending through the sleeves 228, 229, is a rotor shaft 232, which is threaded on its inner end and provided with a pair of lock nuts 233 and a cupped spring washer 234. At its opposite end, the shaft 232 projects outwardly beyond the sleeve 229 and is rigidly molded into a Bakelite knob 235, terminating in an indicator pointer 236, which sweeps over a dial 237 stenciled or otherwise imprinted upon the face of the panel 144 and having indicator numerals ranging from "one" to "twelve," which are more or less aligned, each with one of the contact buttons 230, so as to correspond thereto. Along that portion of its length which lies between the panel 144 and the dielectric base plate 224, the shaft 232 is provided with a tight-fitting dielectric sleeve 232' for supporting the tubular hub portion 238 of an electrically conductive rotor drum 239, the hub portion 238 and dielectric sleeve 232' being pinned rigidly to the shaft 232 by means of a dielectric pin 240. The rotor drum 239 integrally includes an electrically conductive and tubular flange or skirt 241, which is adapted for engagement, along its peripheral or rearwardly presented edge, with the contactor buttons 230 and is provided at one segmental portion of its total circumference with a cutaway portion or so-called "blank spot" 242. The width of the blank spot 242 is slightly greater than the center-to-center distance between any two adjacent contact buttons 230 plus the diametral width of a single contact button, so that one of the twelve contact buttons 230 will always be left out of contactive engagement with the peripheral edge of the drum skirt 241. The blank spot 242 is furthermore aligned with the pointer 236, so that, when the latter is turned into registration with any selected one of the indicator numbers on the dial 237, the contact button 230, which corresponds with that number, will be in alignment with the blank spot 242 and, therefore, be out of contactive engagement. The inner flat face of the drum 239 contactively rides against the contactor shoe 231, so that a circuit may be completed through the shoe 231 and the drum 239 to the remaining eleven contact points 230, all as may best be seen in Figures 21 and 22 and for purposes presently more fully appearing.

Suitably suspended from the top frame 2 is a conventional switch box 243 carrying two double-pole double-throw relays 244, 245, which may be, for convenience, referred to, respectively, as "forward direction relay" and "backward direction relay." Similarly suspended from the top frame 2 is a switch box 246 carrying an automatic reversing switch 247 having actuating coils 247' and 247" respectively associated with single-throw double-pole switches $x$, $z$. Also mechanically associated with the switch $z$ for actuation by the coil 247" is an auxiliary single-throw single-pole switch $b$. Similarly suspended from the top frame 2 is a conventional type of main line fuse switch 248. Also suspended from the top frame 2 is a switch box 249 containing a double-pole double-throw relay 250, which, for convenience, may be designated as the "sweep start and stop relay." Likewise suspended from the top frame 2 is a switch box 251 containing a four-pole double-throw relay 252, which, for convenience, may be designated as the "vacuum pump relay." Finally, a large switch box 253 is suitably suspended from the top frame 2 and contains a three-pole double-throw "lamp control" relay 254 and a thermostatic relay 255' connected in series with one lead to the blower motor 64 and being in temperature responsive relation to the lamp circuit so as to cut out the blower motor 64 when the temperature of the lamp 62 drops below a predetermined point and cut the blower motor 64 back in again when the temperature of the lamp 62 rises above the predetermined point. Mounted upon the sub-frame shelf 5 is a transformer 255 for supplying current to the light source or lamp tube 62. All of the foregoing electrical components are connected as schematically shown in the wiring diagram, Figure 23. Also shown in the wiring diagram, Figure 23, are two conventional main line safety fuses 256, 256', which are located within the main line fuse switch 248.

Bolted upon the forwardly presented vertical face of the base 10 of the cylinder holding apparatus B is a manually operable vertically shiftable plunger pin 257, which drops down and fits snugly into a suitable aperture 258 drilled in the bed-plate 7 and actuatingly engages a microswitch 259 or "safety switch," as it may be called, which is bolted upon the under face of the bed-plate 7. It should be noted in this connection that the aperture 258 is so positioned that the plunger pin 257 will only stop thereinto when the cylinder holding apparatus B is pushed back into so-called "exposure position," that is to say, the position in which the axis of the mandrel 15 is precisely aligned with the axis of the trunnions 42. Also mounted in the switch box 253 is a shutter control relay 260 having an actuating coil 260'. Finally, the bed-plate 7 is provided upon its forwardly presented margin with two rigidly bolted upwardly projecting stock plates 261, 261', for abutting engagement with the forwardly presented face of the base 10 when the cylinder holding apparatus B is pulled forwardly to "cylinder resetting position" to prevent the cylinder holding apparatus B from being accidentally pulled too far forwardly and accidentally dropping over the forward edge of the bed-plate 7, as best shown in Figure 1 and 2.

The operation of the various circuits and electrical components is as follows:

Assuming that the negative $n$ has been properly installed in the negative holding clamps 17, 17', and the cylinder holding apparatus B has been pushed back to its operative "exposure" position, the safety switch 259 is closed by the locking plungers 257. This safety switch 259 operates to disconnect the lamp moving circuit to the motor 86 when the plunger 257 is lifted up out of place so as to prevent lamp movement when the cylinder holding apparatus B is moved forwardly into cylinder resetting position. Consequently, when the cylinder holding apparatus B is returned to "exposure" position and the plunger 257 drops in the aperture 258, engaging the actuating member of the safety switch 259, the latter is closed and the circuit to the motor 86 is conditioned for energization. The main line switch 248 may then be closed and the switches 160, 160', are then turned on.

Thereupon, the operator will set the machine A for any desired sweep degree by manually operating the correspondingly selected one of the sweep switches 157, 158, and 159. For instance, if a 60° angle of sweep is desired, sweep switch 157 will be turned on. Incidentally, it may be noted that the sweep switch 159 acts as a limit switch in case the sweep switches 157 and 158 are inadvertently left on, the point being that the 180° sweep switch 159 merely operates as a reversing switch to prevent rotation beyond an angle of 90° on either side of "zero position." If, then, a sweep of 60° is desired, in order to cover the narrowest exposure area, switch 157 will be closed and switches 163, 164, are turned on, so that the light 62 will be warmed up. Next in order, the vacuum pump switch 165 is turned on. The blower switch 164 can be turned on and off at will to close the circuit to the blower motor 64. The lamp switch 163, which controls the lamp 62, is connected in series with the blower switch 164, so that the lamp 62 cannot be turned on unless the blower motor 64 is on; hence, switch 163 is actually in series with switch 164, so that closure of the switch 164 is a condition precedent to closure of the switch 163.

The vacuum pump switch 165 is then closed, energizing the vacuum pump 23. Whether or not the vacuum pump 23 is energized before or after the lamp 62 is turned on is optional. It should be noted in this connection that the vacuum pump circuit is independent of the exposure circuit because the vacuum pump 23 must be on when the negative n is placed under the negative holding bars 18.

Next, the number of sweeps is established by setting the cycle selector switch 156. It should be noted that each of the contact buttons 230 of the switch 156 is connected in series with a group of three successive contact buttons 223 on the sweep counter 155. Thus, when the pointer 236 is turned to any one of the numbers on the dial 237, the contact button 230 corresponding to that number will be the one which is out of contact, that is to say, opposite the blank spot 242 of the rotor drum 239, and the particular set of three contact buttons 223 which are in series with such disengaged contact button 230 will be "dead," so to speak. The rotor drum 239 of the cycle switch 156 is furthermore electrically connected to the line through other control circuits presently to be described.

The machine A is now set to operate and is placed in operation by pressing the button of the switch 151, thereby momentarily energizing coil 203, returning the sweep counter 155 to "zero" position, if, by chance, it is not already in such position. The button of switch 152 is next pressed, momentarily energizing coil 177 to move the contactor shoe 222 of the sweep counter 155 to the first contact point thereof. Thereupon, the button of the switch 154 is pressed, thereby energizing the circuit to relay 250.

Since the switch 161 is closed, one side of the relay 250 will be connected through the switch 161 to the line and the other side of the relay 250 will be connected through the other side of the switch 161 to the line through the switch 154.

The blade of the switch 154 is connected in common with the blade of the switch 153 to one terminal of the switch 151. It will be noted that normally, when the switch 151 is open, the blade thereof is in contact with this last-named contact point and will energize this line to the blades of the switches 153 and 154. This is a safety device, so that, when the switch 151 is pressed in order to reset the sweep mechanism, the electrical connection to the blades of the switches 153 and 154 will be broken, thereby shutting down the machine A if, by accident, it has been left in operation.

The blade of the switch 151 is connected to the blade of the switch 115, which is one of the three series connected sweep limit switches actuated by the screw driven slide block 108. It should be noted that this switch 115 corresponds to the 180° limit, i. e., it is one of the forward limit switches controlling the sweep movement. The blade of this switch 115, when the switch 115 is open, rests upon one contact point which is connected to the blades of the other two forward limit switches 116, 117, and to one of the contacts of the switch 159 (180° sweep switch). It should be noted that this particular contact point is also in series through the blades of the switches 116, 117, and with the corresponding poles of the switches 157, 158, so that, whichever one of these is closed, a circuit will be made from the blade of the switch 116 through to the contact point of the forward direction control relay 244.

It should also be noted that the blade of the switch 151 is connected directly to one blade of the switch 161; hence, the blades of the switches 153, 154, are always connected through the blade of the switch 151 to the line.

When the coil 250' of the relay 250 is momentarily energized by closure of the switch 154, the relay 250 is closed and thereupon holds itself in closed circuit position through an interlock control, i. e., the contact which is under the blade normally connected to the line through the switch 154 is permanently connected to one contact of the switch 153 and the blade of the switch 153 normally rests in contact with that contact when the switch 153 is open, so that, after the machine A is in full operation, the switch 153 may be pressed, opening that circuit, breaking the flow of current to the interlock contact point, de-energizing the coil 250', and allowing the relay 250 to open itself.

The switch 153 serves as an emergency stop device, and, when pressed, will arrest movement of the machine without resetting any of the controls or disturbing the condition of the sweep counter switch 155 or the directional relays 244, 245. This makes it possible for the machine A, after an emergency stop, to be started exactly where it left off.

As the relay 250 closes, the machine A will immediately commence operation and the following sequence of electrical contacts will take place. The main blade of the relay 250 is connected to the line in the same manner as the blades of the switches 153, 154, and, when closed, transmits current through its contact point to one side of each of the reversing switch coils 247', 247''. For purposes of convenience, these reversing switch coils 247' and 247'' will be referred to, respectively, as the "forward" and "backward" reversing switch coils. The other terminal of the "backward" reversing switch coil 247'' is connected directly to the normally open terminal of the backward direction relay 245 and the corresponding terminal of the "forward" reversing switch coil 247' is connected to the normally open contact of the forward direction relay 244. The normally closed contact of the forward direction relay 244 is connected in series with one terminal of the actuating coil 245' of the backward direction relay 245. The other terminal of the coil 245' is connected to the cycle switch 156 and to the first contact point on the sweep counter 155. Since the sweep set switch 152 has been closed and the arm of the sweep counter 155 is in contact with the first contact point, the latter contact arm is connected in series with the blades of the switches 157, 158, and 159.

Since the switch 157 has been closed, a circuit is completed through the contact point of the switch 157 through the forward limit switches 119, 120, and 121. Thus, the contact arm of the sweep counter switch 155 will be connected through the left hand contact (reference being had to Figure 23) of the switch 157 to the normally closed contact point of the switch 119, and through the blade thereof to the normally closed contact of the limit switch 121 and through the blade thereof down to the common hot lead which extends through the blade of the switch 161 to the main line. The coil 244' of the relay 244 is, therefore, energized and the relay 244 closes. The blade of the relay 244 is conected to one pole of the safety switch 259. As above pointed out, when the cylinder holding apparatus B is in "exposure" position and the plunger 257 is in the aperture 258, the switch 259 will be closed, so that the contact point, which is connected to the blade of the relay 244, will be connected through the safety switch 259 to the line through the switch 161. On the other hand, if the cylinder holding apparatus B is not in "exposure" position and the plunger 257 is out of place, the safety switch 259 will be open and no current will flow to the blade of the relay 244. On the contrary, the current will flow through the blade of the switch 259 to the other contact point of the switch 259 and thence to the light 168, which will thus be turned on to indicate the fact that the cylinder holding apparatus B is not in "exposure" position. Assuming that the table is in "exposure" position and the switch 259 is closed, current will flow through the closed blade of the relay 244 and the contact thereof direct to the "forward" coil 247' of the reversing switch 247, which thus becomes energized, closing the switch 247 in the "forward" position, transmitting current from the line to the motor 86 in such a direction as to cause the motor to run in the "forward" direction, and, as previously pointed out, the brake solenoid 129 is energized to shift the brake shoes 124 into released position.

The "shutter control" relay 260 is connected in series with the switch 162 and the shutter solenoid 82 and its actuating coil 259' is connected in parallel with the motor 86 and solenoid 129. Thus, when the circuit to the motor 86 is energized, the coil 260' of the relay 260 will be energized, so that the relay 260 will be closed, connecting the shutter solenoid 82 to the 110 volt line and the shutter plates 69, 69', will be electrically opened as the sweep starts. When the coil 260' of the relay 260 is again deenergized, as will be presently explained, the relay 260 opens again and the shutter plates 69, 69', are closed. It is important to note that the shutter is opened only when the motor 86 is running and is always shut when the motor 86 is off, except that provision is made through a manually operable switch 262, also mounted in the panel 144, whereby the shutter solenoid 82 can be energized independently of the automatic circuits, so that, if the operator desires, he can manually open the shutter plates 69, 69'.

As the main drive motor 86 operates, the lamp assembly L will move forwardly through an arc of 30° and simultaneously the lead screw 105, which is also driven by the motor 86, will traverse the slide block 108 to the left and engage the fixed contact and will strike the roller of the switch 119, closing it by moving the blades thereof from normally opened position to closed position. This will break the circuit, which, up to now, has been established to the coil 244' of the "forward" relay 244 and, at the same time, will close a circuit to the coil 245' of the "backward" relay 245. As the circuit is broken to the coil 244' of the "forward" relay 244, the blade thereof swings back into normally open position and contacts its "open" position contact point, thereby closing a circuit through the safety switch 259 to the line, so that the coil of the "backward" relay 245 will immediately be energized, and, thereupon, the relay 245 closes, transmitting current to the other coil 247" of the reversing switch 247. Upon becoming energized, the coil 247" shifts the reversing switch to its "backward" position, connecting up the coils of the motor 86 in the opposite direction, so that the motor 86 will drive the lamp assembly L reversely. As the relay 245 closes, it will also close an interlocking contact, so that the relay 245 will remain closed even after the motor 86 has begun to rotate in the reverse direction and the slide block 108 begins to move in the reverse direction away from mechanical contact with the roller 119' of the switch 119.

The motor 86, now moving in reverse direction, swings the arms 47, 51, and associated structure upwardly through an angle of 30° to "zero" position and then beyond "zero" position to a position 30° on the other side, whereupon the shoe 114' carried by the slide block 108 contacts the roller 117' of the switch 117, moving the blade of the switch 117 from its normally closed position to an open position. The interlock of the relay 245 has been connected through one pole of the switch 157 and the blade of the switch 117 through the switch 115 to the line; thus, when the switch 117 is actuated, the circuit to the interlock will be broken and the relay 245 will drop into open position. As the backward direction relay 245 drops into open position, a circuit will again be completed to the coil 244' and the controls will again be reversed so as to cause the motor 86 to move the lamp assembly L in the forward direction. This action is repeated at each limit to and fro, so that the sweep will oscillate through an arc of 60° (30 on either side of the "zero" position).

This back and forth movement would continue without interruption except for the fact that on each back stroke of the slide block 108 the shoe 114 will contact the roller 122' of the microswitch 122, momentarily transmitting current from a contact, which is closed when the reversing switch 247 is in "backward" position, to the ratchet solenoid 177, giving one impulse thereto and moving the arm of the sweep counter 155 one step forward.

If the cycle switch 156 is set for a single sweep, the contactor shoe 222 will move off of the first contact to the second contact, but this latter contact will not be energized because it will be opposite the blank spot 242 on the drum 239 of the cycle switch 156 and current will not be transmitted to the relay 244 through the arm of the sweep counter 155. It should be noted that the relay 245 is normally held closed by its interlock, so that, when it is operated, it holds itself closed until the limit switch 119 (or the companion switches 120, 121, if the machine is set for either 120° or 180° sweeps) is contacted and thrown open. On the other hand, the forward driving circuit through the relay 245 is held closed by the contact arm of the sweep counter 155, which is in parallel with the center microswitch 118 also normally closed. Consequently, when the shoe 114 carried by slide block 108 upon its backward movement contacts the counter impulse switch and moves the counter arm over to the second or "dead" contact point, thus breaking the circuit through the switch arm of the sweep counter 155 to the relay 244, a circuit will be momentarily maintained through the normally closed center switch 118, but as the lamp assembly L returns from the backward limit and approaches "zero" position, the shoe 114 will open the switch 118 as "zero" position is reached, stopping the lamp assembly L precisely at such "zero" position, turning off the motor 86 and immediately applying the brake shoes 124 to the brake drum 123, preventing overtravel past "zero" position.

As previously described, when the motor 86 stops, the circuit to the coil 260′ will be open and the shutter solenoid 82 will be de-energized, returning the shutter to closed position. Thus, when the cycle switch 156 is set on the first or "one-cycle" contact, that is, for one sweep, the machine A will perform a single sweep and come to a stop. If, however, the switch is set on one of the higher numbers, it will perform any multiple of three sweeps and stop, because each three successive groups of contact points 223 on the sweep counter 155 are connected together.

When the switch 151 is closed, the light 166 will turn on, indicating that sweep counter 155 has returned to "zero" position. When the switch 152 is closed, the light 166 will turn off again, indicating the machine A is then ready to start a new cycle of exposure. The light 167 indicates that the lamp assembly L is in "zero" position and serves as a safety light, since the machine A is built to fairly close dimensional limits and the cylinder holding apparatus B can only be moved from its "exposure" position into the forward or "cylinder resetting" position when the lamp assembly L is in, or rearwardly of, "zero" position. The fact that the lamp assembly L is properly in "zero" position is indicated by the fact that the light 167 will be lighted whenever the switch 118 is closed. It will be evident that the light 167 will blink each time the lamp assembly L passes through center or "zero" position. This blinking function is also important in that it indicates when the lamp assembly L is passing through "zero" position. Consequently, if some emergency arises wherein it becomes necessary to remove the negative or, for some other reason, pull the carriage forwardly for inspection, the operator can wait until the light 167 blinks before pressing the switch 153, thereby assuring himself that the lamp assembly L is at or rearwardly of its "zero" position, permitting enough clearance for forward sliding of the cylinder holding apparatus B.

The light 169 indicates that the shutter plates 69, 69′, are open and is in series with the automatic shutter opening circuit, so that, when the switch 162 is closed, placing the shutter motor 82 on automatic operation, the light 169 will be lit to indicate this condition. Similarly, the lights 170, 171, and 172 are respectively in parallel with the switches 163, 164, and 165 to indicate when such switches are in closed position. It will, of course, be obvious in this connection that the machine A should preferably be installed in a dark or dimly lighted room, so it is essential that the condition of each operational circuit be indicated by a suitable light, and it will also be apparent that these lights 166 to 172, inclusive, must be covered with a conventional "dark room" lens.

The foregoing description of operation has been based upon the assumption that the machine A has been set up for 60° sweeps. If 120° sweeps are desired to provide greater exposure time or to cover a greater area of the negative $n$, the switch 158 will be closed instead of the switch 157. In such case, the shoe 114′ of the slide block 108 will, during its to-and-fro travel, pass over the rollers 117′ and 119′ of the microswitches 117, 119, respectively, without producing any result, but the micro-switches 116 and 120 now become the limit switches and function in the same manner as above described in connection with the switches 117, 119, to alternately reverse the direction of the motor 86. Finally, if a 180° sweep is desired, the switch 159 is closed, leaving the switches 157, 158, untouched and the micro-switches 115, 121, become the limit switches and take over the functions of the micro-switches 116, 117, 119, and 120.

If desired, a modified form of positioning mechanism may be provided, as shown in Figures 24 to 27, inclusive, comprising front and rear bearing posts 270, 271, located equidistantly to the front and rear, respectively, of the lead screw 105 and provided upon their upper faces with microswitches 272, 273, respectively corresponding to the previously described micro-switches 118, 122, and having roller elements 272′, 273′, located for actuating contact with the shoes 114, 114′, carried by the slide block 108 and nut 109. The slide block 108 is mounted for shiftable travel along the upper rail portion 107′ of an L-shaped member 106′, substantially similar to the previously described member 106, except that the rail portion 107′ is provided with a relatively large clearance aperture 274 which is transversely in line with the center line of the bearing post 271 for permitting passage of a shaft 275, which is journaled at its opposite ends in the posts 270, 271. At its forward end, the shaft 275 projects outwardly beyond the bearing post 271 and, on such projecting end, is provided with a crank handle 276. Pinned to the shaft 275, along that portion of its length which extends between the bearing post 270 and the handle 276, is a small gear or pinion 277 adapted for meshing engagement with a relatively large spur gear 278, which is, in turn, pinned upon a short jack shaft 279 journaled in, and extending horizontally through, a face plate 280, which is rigidly supported adjacent its lower margins by means of screws 281 and spacer blocks 282 in outwardly spaced parallel relation to the front face of the bearing post 270. The face plate 280 is provided centrally of its lower horizontal margin with an upwardly curved U-shaped recess 283 of such size as to provide clearance around the hub of the handle 276 where the latter projects forwardly through and beyond said plate 280. The jack shaft 279 also projects horizontally forwardly through the plate and is rigidly provided with a pointer needle 284, which, at its outer end, travels along a semicircular indicator scale ranging from "0°" to "180°."

The rear bearing post 271 is of hollow construction so as to provide an interior open space 285 and the shaft 275 is rigidly provided, along that portion of its length which is located within the space 285, with a worm 286 adapted for meshing engagement with a worm gear 287, which is, in turn, pinned upon a shaft 288 journaled at its mid-point in the post 271 and extending horizontally outwardly on the opposite side thereon at right angles to the shaft 275, being also journaled at its opposite ends in lateral bearing posts 289, 290. Along that portion of its length which extends between the bearing posts 271, 289, the shaft 288 is provided with a left-hand thread and similarly on that portion of its length which extends between the bearing posts 271, 290, the shaft 288 is provided with a right-hand thread. Threadedly mounted upon the left-hand threaded and right-hand threaded portions of the shaft 288, respectively, are slide blocks 291, 292, which extend downwardly and are provided at the lower ends with dovetailed grooves 293 for close fitting slidable engagement upon a dovetail slide 294, which is in downwardly spaced vertical alignment with the center line of the shaft 288. Rigidly mounted upon and extending upwardly from the upper horizontal faces of the slide blocks 291, 292, are micro-switches 295, 296, respectively provided with actuating rollers 295', 296'.

Because of the width of the bearing post 271, it is not possible to shift the slide blocks 291, 292, into absolute coincidence. In this connection, it might be pointed out that, if necessary, with minor modifications in construction, an arrangement could be made whereby the two slide blocks 291, 292, could be brought to a true zero position wherein the center lines of the rollers 295', 296', would be in substantial coincidence with the center line of the shaft 275. For practical purposes, however, this has not been found to be necessary since a sweep of 30° (i. e. 15° on either side of zero position) is the smallest sweep which is reasonably needed. Assuming, therefore, that the mechanism is in such position that the pointer 284 is at 30° along the scale on the face plate 280, as shown in Figure 25, in such case, when the machine A is started up, the lead screw 105 will begin to turn and the shoe 114' will travel to the left (reference being made to Figure 25) and will contact the roller 295' of the micro-switch 295 as the lamp assembly L reaches a position 15° forwardly from its zero position. When the micro-switch 295 is actuated, it will operate as a limit switch, initiating a reversing action previously described above in connection with the micro-switch 118. Thereupon, the machine A reverses its direction and the lead screw 105 begins to turn in the opposite direction so as to carry the shoe 114' to the right past center position until the roller 296' of the micro-switch 296 is contacted, at which point the lamp assembly L will have progressed rearwardly to a position 15° from its zero position. Thereupon, the micro-switch 296 initiates a reversing cycle in substantially the same manner as the previously described micro-switch 119.

By turning the handle 276 in a counter-clockwise direction, the worm 286 will rotate the worm gear 287 and shaft 288 associated therewith in such a direction as to shift the slide blocks 291, 292, equidistantly to the left and right, respectively, of the bearing post 271. The gear ratios of the gears 277, 278, 286, 287, and the pitch for the threaded portions of the shaft 288 are such that for each degree of movement of the pointer 284 along the scale of the face plate 280, the slide blocks 290, 291, will be moved outwardly by the exact distance necessary to permit the shoe 114' to travel a somewhat greater distance in either direction horizontally and thereby permit the lamp assembly L to swing forwardly and rearwardly through an additional degree of arc in each direction. For example, when the needle 284 is set at 90°, the lamp assembly L will travel through a sweep of 90° (i. e. 45° on each side of zero position). Thus, it will be seen that, by appropriate setting of the slide blocks 291, 292, as indicated by the pointer 284, an almost infinite degree of variations in the angle of sweep can be achieved between the practical limits of "30°" and "180°" of the scale on the face plate 280. It will also be obvious in this connection that the micro-switch 295 in this modification actually performs the functions of the previously described micro-switches 115, 116, 117, and the micro-switch 296 similarly performs all the functions of the micro-switches 119, 120, 121.

It should be understood that changes and modifications in the form, construction, arrangement, and combination of the several parts of the photoengraving equipment may be made and substituted for those herein shown and described without departing from the nature and principle of my invention.

Having thus described my invention, what I claim and desire to secure by Letters Patent is:

1. A photoengraving machine comprising a stationary mandrel for supporting a cylinder having a photosensitive surface, means for holding a film negative immovably upon the cylinder so that there may be no deviation in register between the negative and photosensitive surface during exposure, rockably pivoted arms mounted in outwardly spaced relation to opposite ends of the cylinder and with their pivots lying along extensions of the axis of the mandrel, a lamp housing supported at its ends on and carried by the arms, a light source in the housing, and driving means for swinging the arms and light housing to and fro around the cylinder whereby to achieve uniformity of light intensity over all parts of the negative during each complete cycle of swinging movement.

2. A photoengraving machine comprising a stationary mandrel for supporting a cylinder having a photosensitive surface, means for holding a film negative immovably upon the cylinder so that there may be no deviation in register between the negative and photosensitive surface during exposure, rockably pivoted arms mounted in outwardly spaced relation to opposite ends of the cylinder and with their pivots lying along extensions of the axis of the mandrel, a lamp housing supported at its ends on and carried by the arms, a light source in the housing, driving means for swinging the arms and light housing to and fro around the cylinder, and a shutter operatively mounted over the light housing between the light source and the cylinder whereby to achieve uniformity of light intensity over all parts of the negative during each complete cycle of swinging movement.

3. A photoengraving machine comprising a stationary mandrel for supporting a cylinder having a photosensitive surface, means for holding a film negative immovably upon the cylinder so that there may be no deviation in register between the negative and photosensitive surface during exposure, rockably pivoted arms mounted in outwardly spaced relation to opposite ends of the cylinder and with their pivots lying along extensions of the axis of the mandrel, a lamp housing supported at its ends on and carried by the arms, a light source in the housing, a reversible motor operatively connected to the arms and light housing for swinging the latter to and fro around the cylinder whereby to achieve uniformity of light intensity over all parts of the negative during each complete cycle of swinging movement, and limit switches operatively associated with the reversible motor for defining the arc of movement of the arms and lamp housing carried thereby.

4. A photoengraving machine comprising a stationary mandrel for supporting a cylinder having a photosensitive surface, means for holding a film negative immovably upon the cylinder so that there may be no deviation in register between the negative and photosensitive surface during exposure, rockably pivoted arms mounted in outwardly spaced relation to opposite ends of the cylinder and with their pivots lying along extensions of the axis of the mandrel, a lamp housing supported at its ends on and carried by the arms, a light source in the housing, a reversible motor operatively connected to the arms and light housing for swinging the latter to and fro around the cylinder whereby to achieve uniformity of light intensity over all parts of the negative during each complete cycle of swinging movement, a lead screw also driven by the motor in timed relation to the movement of the arms, a traveler operatively mounted on the screw for movement lengthwise of the screw, and means along the path of the traveler for actuation thereby, said means being adapted, upon actuation, to reverse the direction of movement of the driving means.

5. A photoengraving machine comprising a stationary mandrel for supporting a cylinder having a photosensitive surface, means for holding a film negative immovably upon the cylinder so that there may be no deviation in register between the negative and photosensitive surface during exposure, rockably pivoted arms mounted in outwardly spaced relation to opposite ends of the cylinder and with their pivots lying along extensions of the axis of the mandrel, a lamp housing supported at its ends on and carried by the arms, a light source in the housing, an electric motor operatively connected to the arms for swinging them to and fro around the cylinder whereby to achieve uniformity of light intensity over all parts of the negative during each complete cycle of swinging movement, a lead screw also driven by the motor in timed relation to the movement of the arms, a traveler operatively mounted on the screw for movement lengthwise of the screw, and means along the path of the traveler for actuation thereby, said means being adapted, upon actuation, to reverse the direction of movement of the motor.

6. A photoengraving machine comprising a stationary mandrel for supporting a cylinder having a photosensitive surface, means for holding a film negative immovably upon the cylinder so that there may be no deviation in register between the negative and photosensitive surface during exposure, rockably pivoted arms mounted in outwardly spaced relation to opposite ends of the cylinder and with their pivots lying along extensions of the axis of the mandrel, a lamp housing supported at its ends on and carried by the arms, a light source in the housing, a reversible electric motor operatively connected to the arms for swinging them to and fro around the cylinder whereby to achieve uniformity of light intensity over all parts of the negative during each complete cycle of swinging movement, a reversing switch for controlling the direction of movement of the motor, and limit switch means actuable responsive to movement of the arms and connected to the reversing switch means for operating the latter.

7. A photoengraving machine comprising a stationary mandrel for supporting a cylinder having a photosensitive surface, means for holding a film negative immovably upon the cylinder so that there may be no deviation in register between the negative and photosensitive surface during exposure, rockably pivoted arms mounted in outwardly spaced relation to opposite ends of the cylinder and with their pivots lying along extensions of the axis of the mandrel, a lamp housing supported at its ends on and carried by the arms, a light source in the housing, a reversible electric motor operatively connected to the arms for swinging them to and fro around the cylinder whereby to achieve uniformity of light intensity over all parts of the negative during each complete cycle of swinging movement, a reversing switch for controlling the direction of movement of the motor, and a plurality of preselectable limit switch means actuable responsive to movement of the arms and connected to the reversing switch means for operating the latter.

8. A photoengraving machine comprising a stationary mandrel for supporting a cylinder having a photosensitive surface, means for holding a film negative immovably upon the cylinder so that there may be no deviation in register between the negative and photosensitive surface during exposure, rockably pivoted arms mounted in outwardly spaced relation to opposite ends of the cylinder and with their pivots lying along extensions of the axis of the mandrel, a lamp housing supported at its ends on and carried by the arms, a light source in the housing, a reversible electric motor operatively connected to the arms for swinging them to and fro around the cylinder whereby to achieve uniformity of light intensity over all parts of the negative during each complete cycle of swinging movement, a reversing switch for controlling the direction of movement of the motor, and a pair of adjustably locatable limit switch means actuable responsive to movement of the arms and connected to the reversing switch means for operating the latter.

9. A photoengraving machine comprising a stationary mandrel for supporting a cylinder having a photosensitive surface, means for holding a film negative immovably upon the cylinder so that there may be no deviation in register between the negative and photosensitive surface during exposure, rockably pivoted arms mounted in outwardly spaced relation to opposite ends of the cylinder and with their pivots lying along extensions of the axis of the mandrel, a lamp housing supported at its ends on and carried by the arms, a light source in the housing, a reversible electric motor operatively connected to the arms for swinging them to and fro around the cylinder whereby to achieve uniformity of light intensity over all parts of the negative during each complete cycle of swinging movement, reversing switch means for controlling the direction of movement of the motor, a lead screw driven by the motor in timed relation to the movement of the arms, a traveler mounted on the lead screw for longitudinal translation therealong, a manually rotatable screw mounted in spaced parallel relation to the lead screw, members operatively mounted on the manually rotatable screw for movement into different selected positions along the path of the traveler, and limit switches mounted on the members and adapted to be actuated by the traveler, said limit switches being connected to the reversing switch for controlling the latter.

10. A photoengraving machine comprising a stationary mandrel for supporting a cylinder having a photosensitive surface, means for holding a film negative immovably upon the cylinder so that there may be no deviation in register between the negative and photosensitive surface during exposure, rockably pivoted arms mounted in outwardly spaced relation to opposite ends of the cylinder and with their pivots lying along extensions of the axis of the mandrel, a lamp housing supported at its ends on and carried by the arms, a light source in the housing, a reversible electric motor operatively connected to the arms for swinging them to and fro around the cylinder whereby to achieve uniformity of light intensity over all parts of the negative during each complete cycle of swinging movement, a reversing switch for controlling the direction of movement of the motor, a pair of limit switches actuable responsive to movement of the arms for actuating the reversing switch means, and a pre-settable counting switch connected in circuit with the motor and other switches for automatically recording the number of swings made by the arms stopping the motor when a pre-selected count has been reached.

11. A photoengraving machine comprising a stationary mandrel for supporting a cylinder having a photosensitive surface, means for holding a film negative immovably upon the cylinder so that there may be no deviation in register between the negative and photosensitive surface during exposure, rockable arms mounted at opposite ends of the cylinder for movement about an axis coincident with the axis of the mandrel, a lamp housing supported at its ends on and carried by the arms, a light source in the housing, a reversible electric motor operatively connected to the arms for swinging them to and fro around the cylinder whereby to achieve uniformity of light intensity over all parts of the negative during each complete cycle of swinging movement, reversing switch means for controlling the direction of movement of the motor, limit switch means actuable responsive to movement of the arms for actuating the reversing switch means, counting means for automatically recording the number of swings made by the arms, and a control switch for interrupting the circuit to the motor when a preselected number of swings have been recorded in the counting means.

12. A photoengraving machine for exposing photosensitized cylinders comprising a table-like base, a lamp assembly swingably mounted for rocking movement above the base about an axis located in upwardly spaced parallel relation to the top surface of the base, and a cylinder-supporting carriage slidably mounted on the base for movement along a path at right angles to the axis of rotation of the lamp assembly, locking means optionally connecting the carriage rigidly to the base in an operative position in which the cylinder will be supported in precise co-axial alignment with the axis of rotation of the lamp assembly.

13. A photoengraving machine for exposing photosensitized cylinders comprising a table-like base, a lamp assembly swingably mounted for rocking movement above the base about an axis located in upwardly spaced parallel relation to the top surface of the base, a cylinder-supporting carriage slidably mounted on the base for movement along a path at right angles to the axis or rotation of the lamp assembly, locking means optionally connecting the carriage rigidly to the base in an operative position in which the cylinder will be supported in precise co-axial alignment with the axis of rotation of the lamp assembly, an electric motor operatively connected to the lamp assembly for swinging said lamp assembly to and fro, and a safety switch connected in series with the motor, said switch being normally open to prevent energization of the motor and being adapted for closure only when the carriage is shifted into operative position.

14. A photoengraving machine comprising a horizontal base, support members mounted in parallel relation upon the base and spaced from each other lengthwise along the base, a carriage mounted for shifting movement transversely across the base between the support members, stop means for optionally holding the carriage in a predetermined position along its path of movement, a mandrel mounted on and supported by the carriage in upwardly spaced parallel relation to the base, a rocking arm mounted on each of the support members for movement about centers coincident with the longitudinal axis of the mandrel when the carriage is in said predetermined position, an elongated lamp housing rigidly mounted on and extending lengthwise between the rocking arms in outwardly spaced parallel relation to the longitudinal axis of the mandrel, and a reversible motor operatively associated with the rocking arms for swinging the lamp housing to and fro along an arcuate path over the mandrel.

15. A photoengraving machine comprising a horizontal base, support members mounted in parallel relation upon the base and spaced from each other lengthwise along the base, a carriage mounted for shifting movement transversely across the base between the support members, stop means for optionally holding the carriage in a predetermined position along its path of movement, a mandrel mounted on and supported by the carriage in upwardly spaced parallel relation to the base, a rocking arm mounted on each of the support members for movement about centers coincident with the longitudinal axis of the mandrel when the carriage is in said predetermined position, an elongated lamp housing rigidly mounted on and extending lengthwise between the rocking arms in outwardly spaced parallel relation to the longitudinal axis of the mandrel, a reversible motor operatively associated with the rocking arms for swinging the lamp housing to and fro along an arcuate path over the mandrel, and a brake operatively associated with the motor for bringing the lamp housing to an immediate stop at predetermined positions in the course of its travel.

16. A photoengraving machine comprising a horizontal base, support members mounted in parallel relation upon the base and spaced from each other lengthwise along the base, a carriage mounted for shifting movement transversely across the base between the support members, stop means for optionally holding the carriage in a predetermined position along its path of movement, a mandrel mounted on and supported by the carriage in upwardly spaced parallel relation to the base, a rocking arm mounted on each of the support members for movement about centers coincident with the longitudinal axis of the mandrel when the carriage is in said predetermined position, an elongated lamp housing rigidly mounted on and extending lengthwise between the rocking arms in outwardly spaced parallel relation to the longitudinal axis of the mandrel, a reversible motor operatively associated with the rocking arms for swinging the lamp housing to and fro along an arcuate path over the mandrel, a reversing switch operatively connected to the motor for reversing the motor as the housing reaches predetermined positions in the course of its travel, a brake operatively associated with the rocking arms, means for normally biasing said brake into engaged position for holding said rocking arm stationary, and solenoid actuated means operatively associated with said brake for holding the brake open in disengaged position, said solenoid being connected in parallel with the reversible motor so as to be energized only when the motor is moving in one selected direction and to be de-energized when the motor is moving in the other direction for bringing the housing to an immediate stop when the motor is being reversed so that reversed travel of the lamp housing may be initiated without appreciable time lag.

THEODORE HOMMEL.

REFERENCES CITED

The following references are of record in the file of this patent:

UNITED STATES PATENTS

| Number | Name | Date |
|---|---|---|
| 1,909,939 | Ernst | May 23, 1933 |
| 2,143,984 | Higgins | Jan. 17, 1939 |
| 2,170,895 | Henderson | Aug. 29, 1939 |
| 2,170,896 | Henderson | Aug. 29, 1939 |
| 2,310,148 | Horn | Feb. 2, 1943 |
| 2,315,829 | Trump | Apr. 6, 1943 |
| 2,364,580 | Young | Dec. 5, 1944 |
| 2,388,264 | Higonet et al. | Nov. 6, 1945 |
| 2,427,923 | Reynolds | Sept. 23, 1947 |

FOREIGN PATENTS

| Number | Country | Date |
|---|---|---|
| 181,633 | Germany | Mar. 2, 1907 |